United States Patent
Eisma et al.

(10) Patent No.: US 7,668,746 B2
(45) Date of Patent: Feb. 23, 2010

(54) HUMAN RESOURCE ASSESSMENT

(75) Inventors: Thomas E. Eisma, Prior Lake, MN (US); Steven E. Eisma, Minneapolis, MN (US); Joel E. Eisma, Prior Lake, MN (US); Mark D. Glenzinski, Prior Lake, MN (US); Ryan E. Cogswell, Columbia Heights, MN (US)

(73) Assignee: Data Solutions, Inc., Minnetonka, MN (US)

( * ) Notice: Subject to any disclaimer, the term of this patent is extended or adjusted under 35 U.S.C. 154(b) by 702 days.

(21) Appl. No.: 11/244,899

(22) Filed: Oct. 6, 2005

(65) Prior Publication Data
US 2006/0031115 A1 Feb. 9, 2006

Related U.S. Application Data

(63) Continuation-in-part of application No. 10/892,416, filed on Jul. 15, 2004.

(51) Int. Cl.
G06F 11/34 (2006.01)
(52) U.S. Cl. ........................................ 705/11
(58) Field of Classification Search ............... 705/11
See application file for complete search history.

(56) References Cited

U.S. PATENT DOCUMENTS

| 6,341,267 | B1 | 1/2002 | Taub |
| 6,640,216 | B1 | 10/2003 | Loofbourrow et al. |
| 6,754,874 | B1 * | 6/2004 | Richman .................... 715/205 |
| 7,110,988 | B1 * | 9/2006 | Allemann et al. ............... 706/7 |
| 2002/0022982 | A1 * | 2/2002 | Cooperstone et al. .......... 705/7 |
| 2002/0035506 | A1 * | 3/2002 | Loya ........................... 705/14 |
| 2002/0069081 | A1 * | 6/2002 | Ingram et al. .................. 705/1 |
| 2002/0184085 | A1 * | 12/2002 | Lindia et al. .................. 705/11 |
| 2004/0024569 | A1 * | 2/2004 | Camillo ....................... 702/182 |
| 2004/0088177 | A1 * | 5/2004 | Travis et al. ................... 705/1 |
| 2004/0172320 | A1 * | 9/2004 | Spellman et al. ............... 705/8 |
| 2008/0255941 | A1 * | 10/2008 | Otto et al. ...................... 705/14 |

FOREIGN PATENT DOCUMENTS

WO WO 01129643 A1 * 4/2001
WO WO 011031427 * 5/2001

OTHER PUBLICATIONS

John Grossmann ("Pay Performance and Productivity," Small Business Reports, New York: Oct. 1992. vol. 17, Iss. 10; p. 50, 10 pg).*

(Continued)

*Primary Examiner*—Scott L Jarrett
*Assistant Examiner*—George H Walker
(74) *Attorney, Agent, or Firm*—Brooks, Cameron & Huebsch, PLLC

(57) ABSTRACT

Methods, devices, and systems are provided for human resource assessment. A resource planning device includes a processor, a memory, and a user interface coupled to one another. The device includes program instructions storable in the memory and executable by the processor to present, in a selectable configuration, organization specific human resource content after processing according to a selectable set of business rules. The selectable set of business rules are process neutral, brand neutral, and assessment neutral between various organizations. The device can track input to the organization specific content and analyze the input.

8 Claims, 22 Drawing Sheets

OTHER PUBLICATIONS

Bill Trahant and W. Warner Burke "Creating a Change Reaction: How Understanding Organizational Dynamics Can Ease Reengineering" National Productivity Review/Autumn 1996, pp. 37-46.*

Barry Povey, ("Continuing improvements" The TQM Magazine. Bedford: Dec. 1993. vol. 5, Iss. 6; p. 37, 4 pgs.*

AppCity.com, "AppRequestServer® on the AppCity Platform White Paper," Dec. 2000.*

* cited by examiner

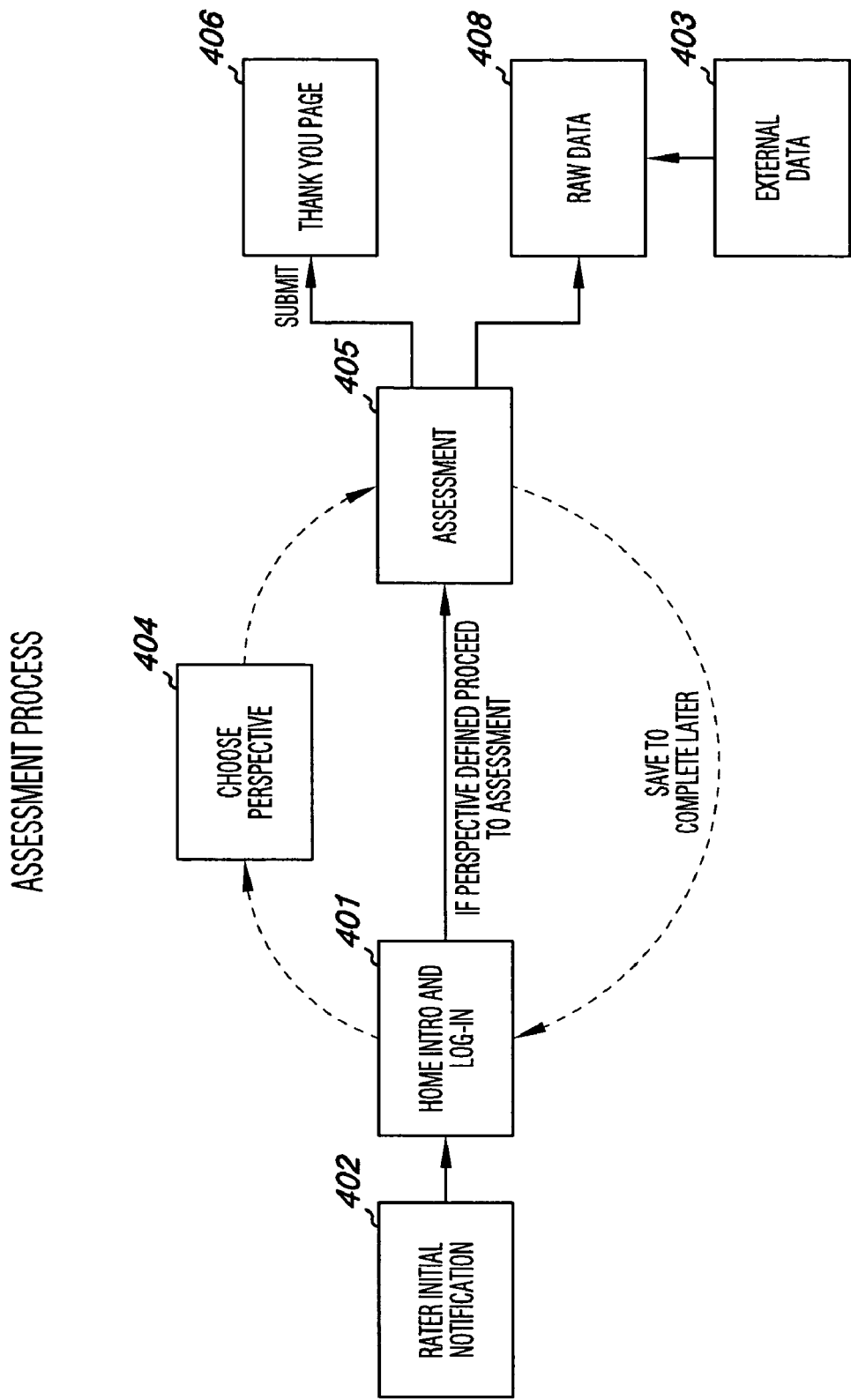

| | ANALYTICAL THINKING | IMPORTANCE<br>1=NOT IMPORTANT<br>2=SOMEWHAT IMPORTANT<br>3=IMPORTANT<br>4=VERY IMPORTANT<br>5=EXTREMELY IMPORTANT | | | | | DIFFICULTY<br>1=EASY<br>2=MODERATELY DIFFICULT<br>3=DIFFICULT<br>4=VERY DIFFICULT<br>5=EXTREMELY DIFFICULT | | | | |
|---|---|---|---|---|---|---|---|---|---|---|---|
| 1. | ACCURATELY IDENTIFIES KEY ISSUES IN COMPLEX PROBLEMS | ○1 | ○2 | ○3 | ○4 | ○5 | ○1 | ○2 | ○3 | ○4 | ○5 |
| 2. | IDENTIFIES CRITICAL FACTORS IN LARGE BODIES OF INFORMATION | ○1 | ○2 | ○3 | ○4 | ○5 | ○1 | ○2 | ○3 | ○4 | ○5 |
| 3. | NOTICES PATTERNS AND INTERRELATIONSHIPS AND MAKES LOGICAL INFERENCES | ○1 | ○2 | ○3 | ○4 | ○5 | ○1 | ○2 | ○3 | ○4 | ○5 |
| 4. | MAKES DECISIONS QUICKLY AND EFFECTIVELY | ○1 | ○2 | ○3 | ○4 | ○5 | ○1 | ○2 | ○3 | ○4 | ○5 |
| 5. | APPLIES SOUND BUSINESS PRINCIPLES TO PROBLEM ANALYSIS | ○1 | ○2 | ○3 | ○4 | ○5 | ○1 | ○2 | ○3 | ○4 | ○5 |
| 6. | EFFECTIVELY ANALYSES HIGHLY COMPLEX OR AMBIGUOUS ISSUES | ○1 | ○2 | ○3 | ○4 | ○5 | ○1 | ○2 | ○3 | ○4 | ○5 |
| 7. | ALWAYS THINKS THROUGH ISSUES CAREFULLY BEFORE RESPONDING | ○1 | ○2 | ○3 | ○4 | ○5 | ○1 | ○2 | ○3 | ○4 | ○5 |
| 8. | IDENTIFIES CRITICAL MISSING INFORMATION | ○1 | ○2 | ○3 | ○4 | ○5 | ○1 | ○2 | ○3 | ○4 | ○5 |
| 9. | IDENTIFIES IMPORTANT ISSUES THAT HAVE BEEN OVERLOOKED | ○1 | ○2 | ○3 | ○4 | ○5 | ○1 | ○2 | ○3 | ○4 | ○5 |
| 10. | IDENTIFIES WHEN A DIFFERENT APPROACH TO A PROBLEM IS REQUIRED | ○1 | ○2 | ○3 | ○4 | ○5 | ○1 | ○2 | ○3 | ○4 | ○5 |
| 11. | DEVELOPS ACTIONABLE RECOMMENDATIONS | ○1 | ○2 | ○3 | ○4 | ○5 | ○1 | ○2 | ○3 | ○4 | ○5 |
| 12. | STEPS BACK FROM SPECIFIC ISSUES AND SEES THE BIG PICTURE | ○1 | ○2 | ○3 | ○4 | ○5 | ○1 | ○2 | ○3 | ○4 | ○5 |

Fig. 10

INSTRUCTIONS: PLEASE RATE EACH PERFORMANCE INDICATOR OVERALL, THEN RATE EACH SPECIFIC ITEM LISTED UNDER THE PERFORMANCE INDICATOR. EACH PERFORMANCE INDICATOR NEEDS THREE RATINGS: CONFORMANCE TO REQUIREMENTS, MOMENTUM, AND IMPORTANCE.

| DEUTSCH | ENGLISH | ESPAÑOL EUROPEO | ESPAÑOL LATINOAMERICANO | FRANCAIS | ITALIANO | NEDERLANDS | PORTUGUÊS |

DEFINITIONS: CONFORMANCE IN THE FOLLOWING SURVEY MEANS "OUR PERFORMANCE MATCHES, OR AGREES WITH, YOUR REQUIREMENTS OF US." MOMENTUM REFERS TO OUR LEVEL OF IMPROVEMENT IN EACH PERFORMANCE INDICATOR.

| PERFORMANCE INDICATOR | CONFORMANCE TO REQUIREMENTS<br>HOW CONSISTENTLY DO WE CONFORM TO YOUR REQUIREMENTS IN THESE SPECIFIC AREAS?<br>1=NEVER CONFORMS<br>2=RARELY CONFORMS<br>3=SOMETIMES CONFORMS<br>4=USUALLY CONFORMS<br>5=ALWAYS CONFORMS | MOMENTUM RATING<br>HOW WOULD YOU DESCRIBE OUR MOMENTUM DURING THE LAST SIX MONTHS?<br>1=EASY<br>2=MODERATELY DIFFICULT<br>3=DIFFICULT<br>4=VERY DIFFICULT<br>5=EXTREMELY DIFFICULT | IMPORTANCE RATING<br>HOW IMPORTANT IS THIS TO YOUR JOB?<br>1=NOT AT ALL IMPORTANT<br>2=<br>3=IMPORTANT<br>4=<br>5=EXTREMELY IMPORTANT |
|---|---|---|---|
| PRODUCT QUALITY | | | |
| OVERALL | ○1 ○2 ○3 ○4 ○5 | ○1 ○2 ○3 ○4 ○5 | ○1 ○2 ○3 ○4 ○5 |
| SPEED OF DELIVERY | ○1 ○2 ○3 ○4 ○5 | ○1 ○2 ○3 ○4 ○5 | ○1 ○2 ○3 ○4 ○5 |
| RELIABILITY | ○1 ○2 ○3 ○4 ○5 | ○1 ○2 ○3 ○4 ○5 | ○1 ○2 ○3 ○4 ○5 |

*Fig. 11*

| | |
|---|---|
| HIGHLY RECOMMENDED | DEMONSTRATES HIGH LEADERSHIP PERFORMANCE IN CURRENT POSITION WHEN COMPARED TO PEERS AND COULD BE CONSIDERED A STRONG CANDIDATE FOR PROMOTION INTO THIS ROLE |
| RECOMMENDED | DEMONSTRATES ACCEPTABLE LEADERSHIP PERFORMANCE IN CURRENT POSITION WHEN COMPARED TO PEERS AND COULD BE CONSIDERED A CANDIDATE FOR PROMOTION INTO THIS ROLE |
| NEEDS DEVELOPMENT | NEEDS ADDITIONAL DEVELOPMENT IN CURRENT POSITION AND AT THIS TIME IS NOT A CANDIDATE FOR PROMOTION INTO THIS ROLE |
| INSUFFICIENT DATA | A RECOMMENDATION CANNOT BE MADE BECAUSE SOME OF THE NECESSARY DATA DOES NOT EXIST |
| CURRENT POSITION | POSITION READINESS RESULTS FOR CURRENT POSITION ARE NOT ACCEPTABLE |
| NOT GRADUATED TRAINING | HAS NOT YET GRADUATED TRAINING NECESSARY TO BE CONSIDERED FOR POSITION |

CLICK ON THE LINKS BELOW TO VIEW DETAILS ON THE CORRESPONDING PEOPLE.
[TITLES AND DETAIL COUNTS ARE CLICKABLE.]

| CURRENT TITLE | # OF PEOPLE | TARGET POSITION | HIGHLY RECOMMENDED | RECOMMENDED | INSUFFICIENT DATA | NOT GRADUATED TRAINING | NEEDS DEVELOPMENT |
|---|---|---|---|---|---|---|---|
| | | | CURRENT POSITION | | | | |
| SUMMARY | 736 | PRODUCTION MANAGER | 72 | 143 | 10 | 33 | 167 | 311 |
| IT MANAGER | 64 | PRODUCTION MANAGER | 0 | 20 | 2 | 3 | 0 | 39 |
| PRODUCTION MANAGER | 236 | PRODUCTION MANAGER | 0 | 14 | 1 | 4 | 166 | 51 |
| QUALITY MANAGER | 1 | PRODUCTION MANAGER | 0 | 0 | 0 | 0 | 1 | 0 |
| SENIOR PROGRAMMER | 3 | PRODUCTION MANAGER | 0 | 2 | 0 | 1 | 0 | 0 |
| SALES PERSON | 72 | PRODUCTION MANAGER | 72 | 0 | 0 | 0 | 0 | 0 |
| SALES MANAGER | 64 | PRODUCTION MANAGER | 0 | 31 | 0 | 2 | 0 | 31 |
| SUPERVISOR | 19 | PRODUCTION MANAGER | 0 | 5 | 0 | 13 | 0 | 1 |
| PROCESS ENGINEER | 277 | PRODUCTION MANAGER | 0 | 71 | 7 | 10 | 0 | 189 |

\* # OF PEOPLE IS THE NUMBER OF PEOPLE WHO HAVE PARTICIPATED IN PERFORMANCE SURVEY PROCESSES NOT THE TOTAL NUMBER IN THIS POSITION.

*Fig. 13*

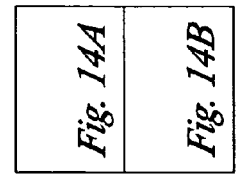

Fig. 14

| Fig. 14A |
|---|
| Fig. 14B |

VIEW / MANAGE OPENINGS: FIND AN OPENING: INTERVIEW STEP          SHORTCUT TO: CANDIDATE LOOKUP

INITIAL JOB OPENING FOR (LOCATION)
INTERVIEW STEP

VIEW: STATUS VIEW | SCREEN STEP | INTERVIEW STEP
ACTIONS: • ADD CANDIDATE

| NAME / TITLE | CAPABILITY RANKING | SITUATION TEST (%CORRECT) | PERFORMANCE RANKING | JOB SPECIFIC RANKING | JOB READINESS | SELECT ACTION |
|---|---|---|---|---|---|---|
| EMPLOYEE 01 / IT MANAGER | 94 | 90 | 82 | 55 | 94 | ** CLICK TO SELECT ** ▷ |
| EMPLOYEE 02 / PRODUCTION MANAGER | 96 | 90 | 65 | 67 | 94 | ACTION: HIRE<br>EDIT ACTION<br>COMMENTS: HIRED AS PRODUCTION MANAGER AT (LOCATION)<br>EDIT |
| EMPLOYEE 03 / SENIOR PROGRAMMER | 93 | 76 | 74 | 47 | 68 | ACTION: HIRE<br>EDIT ACTION<br>COMMENTS:<br>ADD |
| EMPLOYEE 04 / SALES PERSON | 77 | 80 | 66 | 55 | 60 | ACTION: HIRE<br>EDIT ACTION<br>COMMENTS:<br>ADD |

Fig. 14A

| | | | | | |
|---|---|---|---|---|---|
| EMPLOYEE 05 / PROGRAMMER | 65 | 85 | 66 | 53 | 56 | ACTION: HIRE<br>EDIT ACTION<br>COMMENTS:<br>ADD |
| EMPLOYEE 06 / SUPERVISOR | 83 | 85 | 32 | 22 | 41 | ACTION: DO NOT HIRE<br>EDIT ACTION<br>COMMENTS: CANDIDATE FOR (LOCATION), NOT SELECTED AS MOST QUALIFIED CANDIDATE. LETTER MAILED ON 3/08/04 TO APPLICANT.<br>EDIT |
| EMPLOYEE 06 / ADMIN. ASST. | 57 | 86 | 27 | 37 | 35 | ACTION: HIRE<br>EDIT ACTION<br>COMMENTS: HIRED AS PRODUCTION MANAGER FOR NEW (LOCATION)<br>EDIT |
| EMPLOYEE 07 / QUALITY MANAGER | 89 | 86 | — | — | — | ACTION: CANDIDATE WITHDREW<br>EDIT ACTION<br>COMMENTS:<br>ADD |
| EMPLOYEE 01 / SECRETARIAL | 77 | 83 | — | — | — | ** CLICK TO SELECT ** ▽ |

[ SUBMIT SELECTION ACTIONS ]

*Fig. 14B*

| | | HIGHLY RECOMMENDED - DEMONSTRATES HIGH LEADERSHIP PERFORMANCE IN CURRENT POSITION WHEN COMPARED TO PEERS AND COULD BE CONSIDERED A STRONG CANDIDATE FOR PROMOTION INTO THIS ROLE |
|---|---|---|
| ② | | RECOMMENDED - DEMONSTRATES ACCEPTABLE LEADERSHIP PERFORMANCE IN CURRENT POSITION WHEN COMPARED TO PEERS AND COULD BE CONSIDERED A CANDIDATE FOR PROMOTION INTO THIS ROLE |
| ③ | | NEEDS DEVELOPMENT - NEEDS ADDITIONAL DEVELOPMENT IN CURRENT POSITION AND AT THIS TIME IS NOT A CANDIDATE FOR PROMOTION INTO THIS ROLE |

| NAME | LOCATION | TITLE | PERFORMANCE DATA COMPLETION DATE | OVERALL PERFORMANCE | | | | DIVISION MANAGER | PRODUCTION | SUPERVISOR | QUALITY | SALES |
|---|---|---|---|---|---|---|---|---|---|---|---|---|
| | | | | OVERALL PERFORMANCE | PERFORMANCE RANKING | JOB SPECIFIC RANKING | CAPABILITY RANKING | | | | | |
| EMPLOYEE 01 | 1200 | PRODUCTION MANAGER | 10/17/2003 | ③ 1 | ② 1 | ② 2 | 73 | 2 | ③ 2 | 2 | ③ 2 | ③ 2 |
| EMPLOYEE 02 | 1000 | PRODUCTION MANAGER | 02/19/2004 | ③ 2 | ② 2 | ② 4 | 62 | 3 | ③ 3 | 3 | ③ 3 | ③ 3 |
| EMPLOYEE 03 | 0500 | PRODUCTION MANAGER | 05/23/2003 | ③ 50 | 68 | 34 | 96 | 81 | ① 81 | 80 | ① 82 | ① 82 |
| EMPLOYEE 04 | 1000 | PRODUCTION MANAGER | 02/08/2004 | ③ 20 | ② 24 | ② 16 | 81 | 34 | ③ 34 | 34 | ③ 33 | ② 33 |
| EMPLOYEE 05 | 0834 | PRODUCTION MANAGER | 02/18/2004 | ③ 25 | 37 | ② 16 | 96 | 58 | ③ 58 | 59 | ③ 59 | ② 57 |
| EMPLOYEE 06 | 2200 | PRODUCTION MANAGER | 10/21/2003 | ② 49 | 33 | 66 | ② 11 | 30 | ③ 30 | 30 | ③ 29 | ② 28 |
| EMPLOYEE 07 | 0083 | PRODUCTION MANAGER | 10/17/2003 | 50 | 61 | 40 | 34 | 43 | ③ 43 | 46 | ③ 39 | ① 39 |
| EMPLOYEE 08 | 1100 | PRODUCTION MANAGER | 10/29/2003 | ② 43 | 34 | ② 53 | 35 | 37 | 37 | 36 | ③ 32 | ② 31 |

*Fig. 15*

| THEMES | DATA % UNFAVORABLE  % NEUTRAL  % FAVORABLE | VALID N |
|---|---|---|
| *1621* | | |
| **SUPERVISION~ *1610-1*** | | |
| TECHNICAL STAFF | 6% 9% 85% | 31 |
| CONTACT CENTERS AND LOCAL CUSTOMER SERVICE STAFF | 5% 95% | 5 |
| COLLECTIONS / FINANCE / MARKETING / RISK ADMINISTRATIVE ASSISTANTS | 9% 12% 79% | 8 |
| TOTAL BUSINESS UNIT | 8% 15% 77% | 2,127 |
| **MY JOB~ *1610-2*** | | |
| TECHNICAL STAFF | 12% 15% 73% | 31 |
| CONTACT CENTERS AND LOCAL CUSTOMER SERVICE STAFF | 7% 20% 73% | 5 |
| COLLECTIONS, FINANCE, MARKETING, AND MARKETING ADMINISTRATION | 15% 13% 72% | 8 |
| TOTAL BUSINESS UNIT | 16% 20% 64% | 2,127 |
| **TRAINING AND DEVELOPMENT ~ *1610-3*** | | |
| TECHNICAL STAFF | 13% 8% 79% | 31 |
| CONTACT CENTERS AND LOCAL CUSTOMER SERVICE STAFF | 7% 93% | 5 |
| COLLECTIONS, FINANCE, MARKETING, AND MARKETING ADMINISTRATION | 17% 13% 70% | 8 |
| TOTAL BUSINESS UNIT | 20% 19% 61% | 2,129 |
| **TEAMWORK ~ *1610-4*** | | |
| TECHNICAL STAFF | 12% 16% 72% | 31 |
| CONTACT CENTERS AND LOCAL CUSTOMER SERVICE STAFF | 18% 7% 75% | 5 |
| COLLECTIONS, FINANCE, MARKETING, AND MARKETING ADMINISTRATION | 9% 23% 66% | 8 |
| TOTAL BUSINESS UNIT | 12% 20% 68% | 2,129 |
| **COMMUNICATIONS ~ *1610-X*** | | |
| TECHNICAL STAFF | 15% 10% 75% | 31 |
| CONTACT CENTERS AND LOCAL CUSTOMER SERVICE STAFF | 13% 87% | 5 |
| COLLECTIONS, FINANCE, MARKETING, AND MARKETING ADMINISTRATION | 25% 9% 66% | 8 |
| TOTAL BUSINESS UNIT | 15% 18% 67% | 2,126 |

*Fig. 16*

PERSPECTIVE COMPARISONS
STRATEGIC DEVELOPMENT
PRIMARY BOSS RATING OF IMPORTANCE: VERY IMPORTANT
PRIMARY BOSS RATING OF TARGET PERFORMANCE: ADVANCED

PREDEFINED TARGET LEVELS:
DIRECTOR - BASELINE
VICE PRESIDENT - INTERMEDIATE
EXECUTIVE VP - MASTERY

[ S ] = STRENGTH
[ D ] = NEEDS DEVELOPMENT

STRATEGIC DEVELOPMENT - STRATEGIC DEVELOPMENT INVOLVES THE GATHERING OF INFORMATION, SYNTHESIZING INFORMATION, AND FORMULATING BUSINESS STRATEGIES. IT INVOLVES INTERFACING WITH TRADE ANALYSTS, INDUSTRY LEADERS, AND INTERNAL EXECUTIVES TO GATHER AND SYNTHESIZE INFORMATION ABOUT ISSUES THAT EFFECT BUSINESS STRATEGY. AT THE MASTERY LEVEL, IT INVOLVES TAKING OWNERSHIP FOR STRATEGIC RECOMMENDATIONS. (1710)

| COMPETENCY/BEHAVIOR | PERSPECTIVE (1712) | RATING (1714) — NOT DEVELOPED 1 / UNDER DEVELOPED 2 / COMPETENT 3 / VERY STRONG 4 / OUTSTANDING 5 | |
|---|---|---|---|
| GATHERS STRATEGIC INFORMATION (BASELINE) 1720-1 | SELF<br>ALL RATERS<br>PRIMARY BOSS<br>SECONDARY BOSS<br>PEERS<br>DIRECT REPORTS<br>OTHER | 5.00<br>4.13<br>4.00<br>4.00<br>4.25<br>4.25<br>-- | S |
| COMMUNICATES WITH TRADE ANALYSTS TO IDENTIFY INDUSTRY TRENDS 1720-2 | SELF<br>ALL RATERS<br>PRIMARY BOSS<br>SECONDARY BOSS<br>PEERS<br>DIRECT REPORTS<br>OTHER | 5.00<br>4.13<br>4.00<br>4.00<br>4.25<br>4.25<br>-- | D |
| INTERVIEWS C-LEVEL EXECUTIVES TO IDENTIFY CRITICAL BUSINESS CHALLENGES AND OPPORTUNITIES 1720-3 | SELF<br>ALL RATERS<br>PRIMARY BOSS<br>SECONDARY BOSS<br>PEERS<br>DIRECT REPORTS<br>OTHER | 5.00<br>4.13<br>4.00<br>4.00<br>4.25<br>4.25<br>-- | S |
| SYNTHESIZES STRATEGIC INFORMATION (INTERMEDIATE) 1720-4 1722 | SELF<br>ALL RATERS<br>PRIMARY BOSS<br>SECONDARY BOSS<br>PEERS<br>DIRECT REPORTS<br>OTHER | 5.00<br>4.06<br>4.00<br>4.00<br>3.63<br>4.63<br>-- | S |
| COMBINES DATA FROM MULTIPLE SOURCES TO SUPPORT A BUSINESS CONCLUSION 1720-Y | SELF<br>ALL RATERS<br>PRIMARY BOSS<br>SECONDARY BOSS<br>PEERS<br>DIRECT REPORTS<br>OTHER | 5.00<br>4.13<br>4.00<br>4.00<br>3.75<br>4.75<br>-- | S<br>1724 |

*Fig. 17*

ACME ELECTRONICS LEADERSHIP FEEDBACK

| COMPETENCIES (1810) | NUMBER RESP. (1812) | MEAN SCORE (1814) | YOUR MEAN (1816) | DIFFERENCE FROM SELF (1818) | MARKED AS CRITICALLY IMPORTANT (1820) |
|---|---|---|---|---|---|
| 1. STRATEGIC FOCUS | | | | | |
| SELF | 1 | | 4.67 | | |
| PRIMARY MANAGER | 1 | | 3.83 | -0.84 | |
| COLLEAGUES | 7 | | 4.02 | -0.65 | |
| DIRECT REPORTS | 9 | | 4.37 | -0.30 | |
| CUSTOMERS | 7 | | 3.92 | -0.75 | |
| 2. FINANCIAL RESULTS | | | | | |
| SELF | 1 | | 5.17 | | * |
| PRIMARY MANAGER | 1 | | 4.50 | -0.67 | * |
| COLLEAGUES | 7 | | 4.24 | -0.93 | |
| DIRECT REPORTS | 9 | | 4.71 | -0.46 | |
| CUSTOMERS | 7 | | 4.35 | -0.82 | |
| 3. SELF INITIATIVE AND DRIVE | | | | | |
| SELF | 1 | | 4.75 | | * |
| PRIMARY MANAGER | 1 | | 4.00 | -0.75 | |
| COLLEAGUES | 7 | | 3.83 | -0.92 | |
| DIRECT REPORTS | 9 | | 4.43 | -0.32 | |
| CUSTOMERS | 7 | | 4.37 | -0.38 | |
| 4. PROBLEM SOLVING | | | | | |
| SELF | 1 | | 5.17 | | |
| PRIMARY MANAGER | 1 | | 3.67 | -1.50 | |
| COLLEAGUES | 7 | | 4.19 | -0.98 | |
| DIRECT REPORTS | 9 | | 4.51 | -0.66 | |
| CUSTOMERS | 7 | | 4.55 | -0.62 | |
| 5. TALENT MANAGEMENT | | | | | |
| SELF | 1 | | 4.00 | | |
| PRIMARY MANAGER | 1 | | 3.29 | -0.71 | |
| COLLEAGUES | 7 | | 4.22 | +0.22 | |
| DIRECT REPORTS | 9 | | 4.44 | +0.44 | |
| CUSTOMERS | 7 | | 4.01 | +0.01 | |

*Fig. 18*

HUMAN RESOURCE ASSESSMENT

CROSS REFERENCE TO RELATED APPLICATIONS

This application is a Continuation-In-Part of U.S. application Ser. No. 10/892,416, filed Jul. 15, 2004, the specification of which is herein incorporated by reference.

INTRODUCTION

Successful organizations understand the cost and upside of acquiring, growing, and retaining their most talented employees and candidates and the benefits of effective management of their human and other resources. A recent study estimates that the market for talent/resource management technology will exceed $10 billion in the next five years. In a time of frugal investments in technology, this number is staggering.

For example, when businesses face challenges of growing top line revenue, enhancing productivity, and reducing costs, they look to obtain the highest level of productivity from their employees. This involves data to support effective decisions and the ability to deploy strategies that increase the return on human capital.

While systems from major software vendors such as Peoplesoft and SAP focus on the operational aspects of recruiting, promoting, and developing such talent, these systems do not fully address quantitative information on human capital.

BRIEF DESCRIPTION OF THE DRAWINGS

FIG. 4 is a block diagram representing an assessment process embodiment.

FIG. 10 is an example of a assessment for measuring an individual's competency in a particular area.

FIG. 11 is another example of a assessment for measuring an individual's competency in a particular area.

FIG. 13 is an example of scoring results provided by an embodiment of the present invention.

FIGS. 14A and 14B are another example of scoring results provided by an embodiment of the present invention.

FIG. 15 is another example of scoring results provided by an embodiment of the present invention.

FIG. 16 is an example of a portion of a report provided by an embodiment of the present invention.

FIG. 17 is another example of a portion of a report provided by an embodiment of the present invention.

FIG. 18 is another example of a portion of a report provided by an embodiment of the present invention.

DETAILED DESCRIPTION

Embodiments of the present invention include methods, systems, and devices for resource management. For example, a number of embodiments provide resource management solutions for use in the field of human resources. As used herein, human resources is intended to mean the people who make up the work force within an organization, e.g., a corporation whether for profit or not-for-profit. And, as used herein, human capital are intended to mean the skills, qualifications, talents, and knowledge of human resources, whether employees or owners in an organization.

Human resources include executives, regional or business unit heads, store managers, and direct reports/subordinates, among others. Human resources can possess a range of skills and requisite qualifications in such groups (business roles) as top executives, knowledge workers, middle management, skilled workers, less-skilled workers, and bureaucrats.

Similarly, organizations can be grouped in a number of classes such as complex services, simple services, complex distribution, complex networks, complex production, simple production, government, and nonprofit, among others. One of ordinary skill in the art will appreciate that adroit management of small variations in the preferences and skills of individual human resources and/or groups of human resources can make a marked difference in their productivity and the organization's earnings. This is essentially matching the right person to the right job at the right time.

In various embodiments, a system can receive information or allow access to the system from a number of remote devices. The information received can, for example, be employee data from an employer's database. Access to a system, such as from a remote device, can allow a user to set up a client account, fill out a survey, edit employee data, and other such functions, for example.

Figure 1:
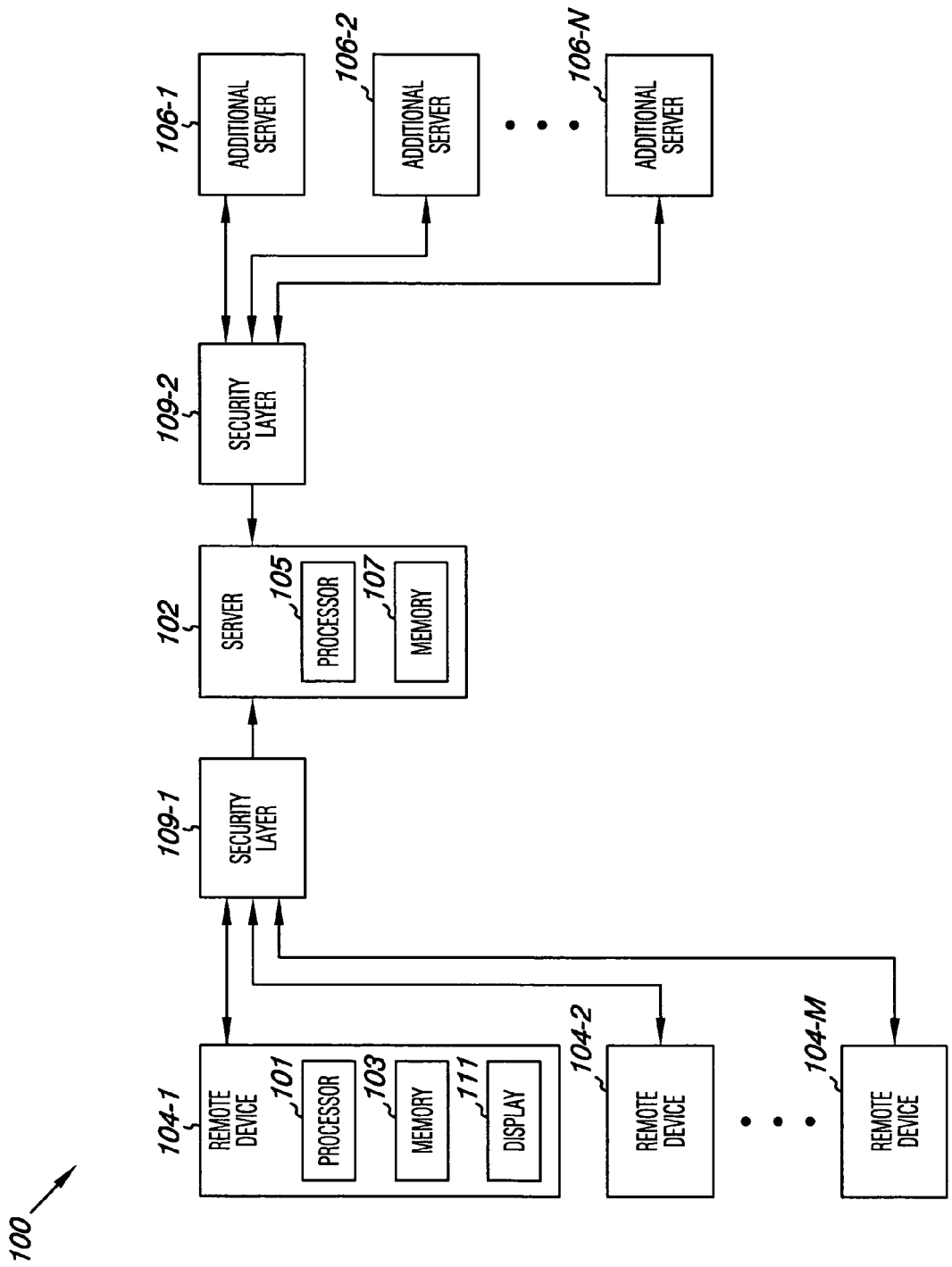
FIG. 1 is an illustration of a system embodiment according to the teachings of the present invention.

FIG. 1 is an illustration of a system embodiment, including a number of device embodiments, according to the teachings of the present invention. The system embodiment shown in FIG. 1 includes a networked system 100. Various embodiments of the present invention include a resource planning device. For example, the embodiment shown in FIG. 1 includes a server 102 as the resource planning device.

Although the term server is used herein, embodiments of the invention are not limited to implementation on such a device and various embodiments can be stand alone devices or systems including a number of devices. It is intended that in embodiments using a server, the server 102 can be provided by any suitable type of computing device, such as personal computers, mainframes, and the like.

Server 102, shown in FIG. 1, includes a processor 105 coupled to a memory 107. Processor 105 and memory 107 can include any type of processor and memory in the art of computing and the various embodiments are not limited to where within a device or system a set of computer instructions reside for use in implementing the various embodiments of invention.

Memory can, for example, include Non-Volatile (NV) memory (e.g. Flash memory), RAM, ROM, magnetic media, and optically read media and includes such physical formats as memory cards, memory sticks, memory keys, CDs, DVDs, hard disks, and floppy disks, to name a few. Memory can include a Direct Access Storage Device (DASD) or be located on another peripheral device that is accessible over a network. One of ordinary skill in the art will appreciate for reading this disclosure that such memory can include data stores, application programs (e.g., computer executable instructions), and the like.

In various embodiments, the server 102 can be connected to a number of additional devices 104-1, 104-2, ..., 104-M, such as remote computing devices. Alphabetical designators "M-Y" as used herein are intended to represent any number of additional devices, components, or entities being discussed. The various designators can represent any value whether or not the value is the same as a value represented by another designator. As stated above, the additional devices 104-1, 104-2, ..., 104-M can be used to allow access to a system or to send information to the system.

Each remote device 104-1, 104-2, ..., 104-M can include processor 101, memory 102, and display 111 capabilities. The display 111 can be included to provide feedback to a user and can include any of various types of computing device displays.

The server 102 and/or remote devices 104-1, 104-2, ..., 104-M are capable of including application programs (e.g., computer executable instructions) to cause a server 102 or other device 104-1, 104-2, ..., 104-M to perform particular functions as described in more detail below.

As shown in the embodiment of FIG. 1, devices 104-1, 104-2, ..., 104-M can couple to the server 102 through a first security layer 109-1, or secure data network 109-1. In this way, security can be provided to the system, however the embodiments of the present invention are not limited to use of a security layer.

Additionally, devices 104-1, 104-2, ..., 104-M can couple to the server 102, such as over various types of networks. For example, the devices 104-1, 104-2, ..., 104-M can be coupled to the server 102 over a local area network (LAN), e.g. an Ethernet network. The devices 104-1, 104-2, ..., 104-M can also couple to the server 102 over a wide area network (WAN), over the public switched telephone network (PSTN), and/or the Internet using transmission control protocol/Internet protocol (TCP/IP).

Networks, as used herein, can include wireless networks as can be accessed by desktop devices, laptop devices, mainframe devices, cell phones, multifunction devices (PDAs), and the like. Wireless networks can include Global System for Mobile communications (GSM) networks, American National Standards Institute (ANSI) networks, Public Wireless Local Area Networks (PWLANs) including Wi-Fi, among others. Thus, devices described herein can be coupled in either direct hardwired fashion, e.g. using copper, coaxial cable, optical fiber connections, and hybrid fiber-coax connection, and/or indirectly in a wireless fashion using remote electromagnetic signal transmission in the radio or microwave frequencies, e.g., RF.

The embodiment shown in FIG. 1 illustrates that the above described components can couple to additional servers and systems, 106-1, 106-2, ..., 106-N, over a network as the same has been described above. Such additional servers and systems, 106-1, 106-2, ..., 106-N, can be maintained by other organizations, or entities. The additional servers and systems, 106-1, 106-2, ..., 106-N, can include core data stores accessible by the server 102 according to definable access rights. The additional servers and systems, 106-1, 106-2, ..., 106-N, can include databases and executable instructions and/or application programs to operate on data and can possess processing and routing capabilities over a PSTN or other network as described above.

The additional servers and systems, 106-1, 106-2, ..., 106-N, can include proprietary databases, data modules, and software systems maintained by a third party or the like. As shown, the additional servers and systems, 106-1, 106-2, ..., 106-N, can be coupled to the server 102 through a second security layer 109-2, or secure data network 109-2 such that data from the additional servers and systems, 106-1, 106-2, ..., 106-N, can be securely exchanged with the server 102.

The server 102, the number of remote devices 104-1, 104-2, ..., 104-M, and the additional servers and systems, 106-1, 106-2, ..., 106-N, can all include one or more computer readable mediums having computer executable instructions. As mentioned above, these computer readable mediums can include devices such as a disk drive for reading data storage media, e.g. a compact disc, and/or computer readable medium such as random access memory (RAM) and read only memory (ROM), non-volatile, optical, or any other type of memory storage medium.

Figure 2:
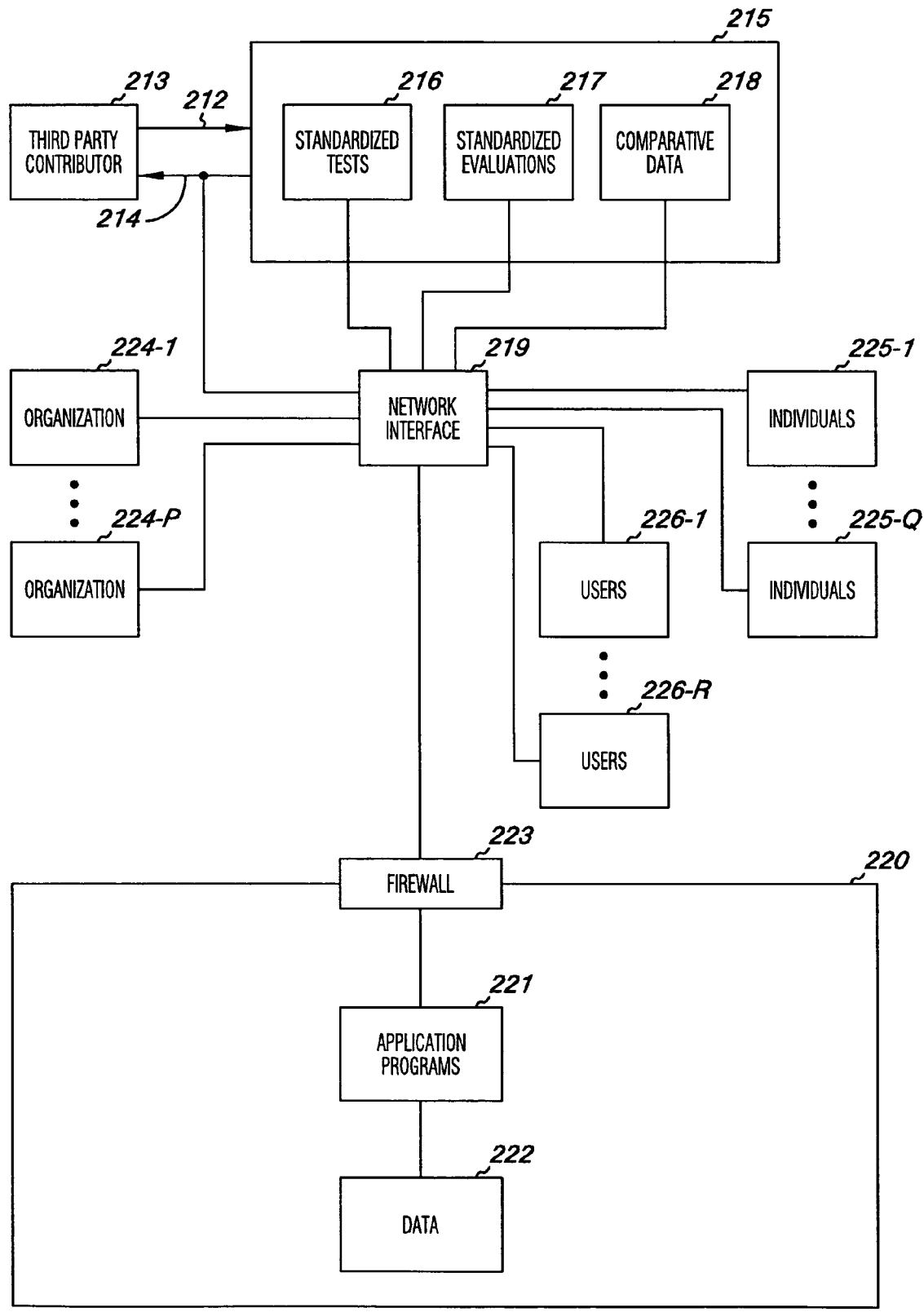
FIG. 2 is another illustration of a system embodiment according to the teachings of the present invention.

FIG. 2 is another illustration of a system embodiment according to the teachings of the present invention. The embodiment of FIG. 2, illustrates a resource planning device 220 coupled to a network interface 219. The resource planning device 220 can include a server, such as server 102 and/or additional servers 106-1, ..., 106-N as illustrated in FIG. 1, having processor, memory, and user interface resources as described above. Network interface 219 can include a number of suitable wireless and hardwired network interfaces such as the LANs, WANs, PSTNs, Internet, GSM, ANSIs, and/or PWLANs including Wi-Fi, as described above. As shown in the embodiment of FIG. 2, the resource planning device 220 can include application programs 221 and various data stores 222 and be coupled to the network interface 219 through a fire wall 223, as the same are known and understood by one of ordinary skill in the art, for security purposes.

As illustrated and discussed in further detail in connection with FIG. 3, the resource planning device 220 includes one or more program modules associated with application programs 221 and/or data 222. According to various embodiments the application programs 221 and modules include program instructions storable in the memory and executable by the processor to present, in a selectable configuration, organization specific human resource content after processing according to a selectably configurable set of logic. According to various embodiments, and as discussed in more detail below, the application programs 221 and modules include program instructions storable in the memory and executable by the processor to track input to the organization specific content and analyze the input.

As illustrated and discussed in further detail in connection with FIG. 3, the selectably configurable set of logic can be included as a set of instructions in a configuration module. As one of ordinary skill in the art will appreciate upon reading this disclosure, the logic is selectably configured based on input to a system resource planning device 220 in order to establish business rules with a number of different organizations. And, as one of ordinary skill in the art will appreciate upon reading this disclosure selectably configurable set of logic used to establish such business rules are organization process neutral, organization branding neutral, and assessment content neutral. As used herein, business process neutral is intended to mean a measurement initiative that is a defined set of business rules can be executed independent of a manner in which an organization defines its business roles and resource assessment. As used herein, brand neutral is intended to mean that the defined set of business rules can be executed with a graphical user interface presentation which is selectable at an organization by organization level which incorporates a particular organization's branding. As used herein, assessment neutral is intended to mean that the defined set of business rules can be executed independent of assessment content used by a given organization, whether provided by a third party (e.g., consulting industrial and organizational psychologists) or created internal to the organization.

As will be explained in more detail below, various application program embodiments include instructions which can be executed by the processor to create an organization specific competency model and an organization specific perspective set associated with resource assessment. In other words, a user of the system resource planning device 220 can effectively turn "on" and "off" switches on an organization by organization basis to tailor the system resource planning device 220 to a particular set of interaction as suited to that organization.

As used herein, the organization specific competency model can, for example, include competency criteria selected from the group of: communication skills; leadership skills; decision making skills; initiative skills; and people skills. The organization specific perspective set includes a human resource perspective selected from the group of: a subordinate level employee; a peer level employee; a division management employee; and an executive management employee. Embodiments, however, are not limited to these examples. In various embodiments, the program instructions can be executed by the processor, in conjunction with the defined set of business rules, to change a nomenclature associated with a human resource perspective.

Program embodiments include instructions which can be executed by the processor to create a number of subsets to each of the competency criteria including, for example, subsets to the leadership skills selected from the group of: achievement; dependability; teamwork; and intellect. Again, however, the embodiments are not limited to these example subsets. Further, program embodiments include instructions which can be executed by the processor to create a battery of user configurable questions associated with various competency criteria and presentable in a format selected from the group of single and multiple response scales. The selectably configurable logic used to establish a particular set of business rules for a given organization can operate on user input to force a scoring distribution among question responses within the competency criteria as part of a validation process.

Program embodiments include instructions which can be executed by the processor to operate on participant response input/data and to categorize response input by competency criteria, business units, and business regions, for example, among other categories. One of ordinary skill in the art will appreciate upon reading this disclosure that the embodiments are not limited to these example categories. Program embodiments include instructions which can be executed by the processor to construct a human resource assessment configured at an organization specific level or from third party provided assessment content. This can include third party assessment content created by industrial and organizational psychologists, as the same are known and understood in the art.

In the embodiment of FIG. 2 a third party contributor (TPC) block is illustrated as 213. The TPC 213 can include a remote device or remote client, shown as 104-1, 104-2, ..., 104-M, and/or can include a server, such as servers 106-1, 106-2, ..., 106-N, in FIG. 1. As shown in the embodiment of FIG. 2 the TPC 213 can be coupled to the human resource planning device 220 via a network interface 219 as the same has been described above. The TPC 213 can be used to provide third party content into the various embodiments of the invention. In an embodiment, such as that shown in FIG. 2, the TPC 213 can be used to supply 212 and retrieve 214 (e.g., generally exchange for updates, modifications or otherwise) third party content such as assessments in the form of particular industry, e.g., standardized tests 216, evaluations 217, and comparative data 218, into a database and/or data repository, shown generally as 215, which can also be coupled to the human resource planning device 220 via a network interface 219. Such third party content can be used in data collection and analysis for human resource planning within the embodiments of the present invention.

That is, this information can be used to add additional content to the various embodiments of the present invention and such assessment information can be used in place of and/or in complement to (e.g., incorporated into) the proprietary assessment content of a particular organization. By way of example and not by way of limitation, comparative data 218 can be used to compare the performance of a particular individual against the performance data available for other similarly situated individuals at other companies or with performance data available regarding an organizations individuals generally. That is, as mentioned above, assessment information on a particular individual can be compared with that individual's own assessment information over time as well as against similarly situated individuals within a particular organization. According to various embodiments the above third party content, e.g., in the form of one or more standardized tests and/or evaluations, can be used in assessing an individual's performance, action planning, and/or organization management, as one of ordinary skill in the art will appreciate upon reading this disclosure. In various embodiments, the third party content assessment information, e.g., surveys, tests, and/or evaluations can be included and analyzed within the system resource planning device 220 itself, and/or the data collection results of various assessments can be shared outside of the system resource planning device 220 with the TPC 213.

The embodiment shown in FIG. 2 also illustrates that a number of clients (e.g., particular organizations) 224-1 to 224-P, individuals (e.g., employees of one or more particular organizations) 225-1 to 225-Q, and system users (e.g., system administrative users and the like) 226-1 to 226-R can connect to the resource planning device 220 through a network interface 219, as the same have been described herein. In various embodiments, particular organizations 224-1 to 224-P, individuals 225-1 to 225-Q, and users 226-1 to 226-R can use remote devices, such as remote devices 104-1, 104-2, ..., 104-M shown in FIG. 1, to input and retrieve (e.g., exchange) information with the system resource planning device 220 through the network interface 219. As one of ordinary skill in the art will appreciate, in some scenarios, the individuals within and organization will only indirectly access or interface the system planning device 220 through a given organization's intranet (e.g., enterprise network) which in turn may be connected to the system resource planning device 220 through the network interface 219. As one of ordinary skill in the art will appreciate upon reading this disclosure, organizations, individuals, and users access the system resource planning device 220 at a variety of levels and for a variety of reasons. As will be explained in more detail below, these various parties may access the system resource planning device 220 for input and retrieving information connected with surveys, testing, multi-rater (e.g., 360 degree feedbacks), etc. Likewise, access can be for purposes of inputting and/or modifying organization competency models, configuring assessment structures, etc., among other purposes. The embodiments are not limited to these examples.

As one of ordinary skill in the art will appreciate upon reading this disclosure, program embodiments associated with system 220 can be added in complement from other host sources, e.g., connected as part of a LAN or WAN, or otherwise, or entirely managed within the system resource planning device 220 acting as an application service provider (ASP). Thus, in various embodiments program instructions can be hosted entirely on the system resource planning device 220, shared with other third party host devices, e.g., additional server systems 106-1, . . . , 106-N (shown in FIG. 1) coupled over the PSTN, Internet or otherwise, and/or hosted entirely on a separate entity's system and can be managed by the system planning device 220 through a network interface 219. Embodiments of the invention are not so limited.

The embodiment of FIG. 2 illustrates application programs 221 for receiving organization, individual, and/or user information and capable of executing instructions to analyzing such information. Although application programs 221 can reside on a server such as server 102 and/or servers 106-1, . . . , 106-N as described in connection with FIG. 1, the embodiments described herein are not limited to a server computing environment. As shown in FIG. 2, the application programs 221 can interface with one or many data stores 222, e.g. data servers, enterprise level databases, and the like. Embodiments, however, are not limited to these examples or to any particular operating and/or network environment or server configuration. The description included herein is provided for purposes of illustration.

As one of ordinary skill in the art will appreciate upon reading this disclosure, data stores 222 can have restricted access to allow access only to authorized individuals, e.g., authorized administrative users, etc. For example, a server can include a data store that can include a number of separate partitions to store data and programs for different subsidiaries, job classes, or job types, geographical locations, employee types, and the like. A server can also include a data store that can include a number of separate partitions to store data and programs for each selectably configured set of business rule according to the program embodiments described herein. As described in more detail below, the selectably configured business rules can include establishing formatting, branding usage, assessment content and assessment content handling rules, and the like. Any number of computing devices, such as servers; application programs; and/or data can be distributed as part of the system resource planning device 220 embodiments described herein.

The program embodiments described herein further include instructions which can be executed by the processor to normalize the input/data to a particular organization's specific content. Program embodiments include instructions which can be executed by the processor to compare the input to the organization specific content to previous input/data by a particular individual and/or across groups within a particular organization. As mentioned above, program embodiments include instructions which can be executed by the processor to compare the input/data to the organization specific content to previous input by a given individual and/or group of individuals, e.g. VPs, business units, etc., and/or across candidates for positions/openings. And further, program embodiments include instructions which can be executed by the processor to allow a particular organization to change a configuration in which their organization specific content is presented.

Figure 3A:
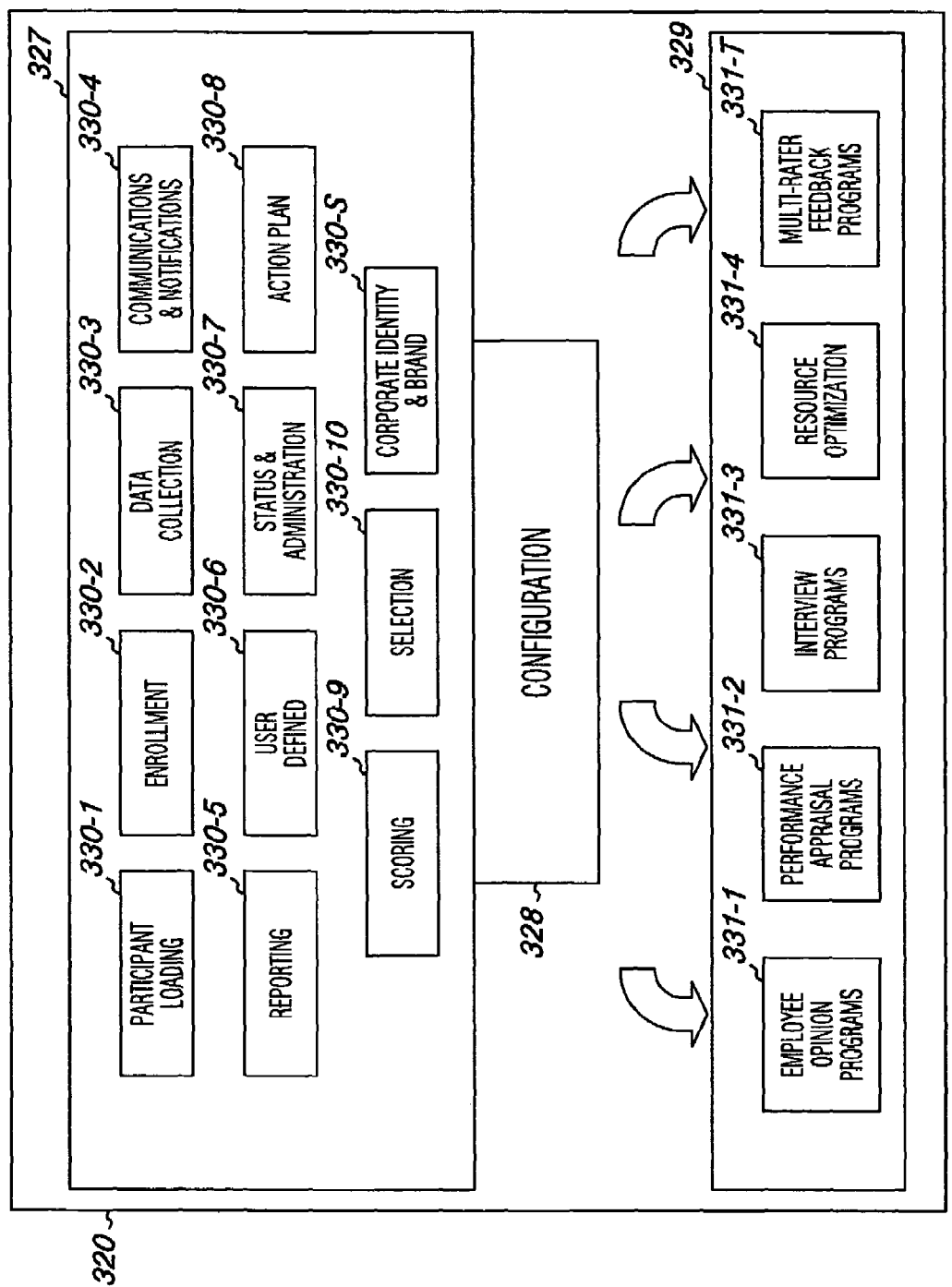
FIG. 3A is a block diagram representing examples of information available to the system and exemplary system functions.

FIG. 3 is a block diagram representing examples of program modules and business processes according to various embodiments of the system resource planning device, shown as 220 in FIG. 2. The embodiment shown in FIG. 3 includes a server 320 having one or more program modules, grouped collectively as 327, which are interfaced with a configuration modules 328 to implement various business processes, shown as 329. As used herein business processes and business competencies generally refer to a given organization's competency structure and terminology employed to fulfill the particular organization's business objectives.

In the embodiment shown in FIG. 3, the system resource planning device 220 (hereinafter referred to as "system" for brevity) includes several program modules illustrated within block 327. The exemplary modules provided include, but are not limited to: a participant load module 330-1, an enrollment module 330-2, a data collection module 330-3, a follow up module 330-4, a reporting module 330-5, a used defined module 330-6, a status and administration module 330-7, an action plan module 330-8, a communications and notifications module 330-9, a selection module 330-10, and a corporate identity and branding module 330-S.

According to the various embodiments, the participant load module 330-1 includes a set of instructions which can be executed by a processor to load a client (e.g., organization) provided file of personnel information in to the system. The participant loading module 330-1 includes a set of instructions which can be stored in memory and executed by the processor to import participant data from a particular organization's enterprise database. That is, the program instructions can be executed to interact with and retrieve appropriate human resource data and associated human capital data from another database. The set of instructions can be executed to do so regardless of the particular platform, e.g., hardware, software, firmware, operating system, etc., used by the organization's enterprise database. In various embodiments the participant loading module 330-1 executes instructions to receive flat data files, XML (extended markup language) files, and the like, e.g., multiple different inputs, including personnel information. Embodiments, however, are not limited to these examples.

As one of ordinary skill in the art will appreciate upon reading this disclosure, a particular organization's enterprise database can include a commercial and/or proprietary set of hardware, software, and/or firmware for providing an organization with enterprise resource management (ERM) capabilities and/or customer relationship management (CRM) capabilities. Examples of known commercial companies which provide such programs include SAP, Oracle, PeopleSoft, and Siebel Systems.

The participant load module 330-1 includes instructions to map client provided data into the system. That is, the participant load module 330-1 can execute instructions to interpret where within the system particular data in the personnel information belongs. For example, one organization's personnel information may include region data and another organization's personnel information may include division data, or both. The participant load module 330-1 can accordingly execute instructions to place these particular, albeit different, data pieces in an appropriate location within a data store associated with the system's resource planning device for respective organizations.

The participant load module 330-1 includes instructions to update participant information from the client provided file, e.g., can execute instructions to determine what data is relevant from a variety of sources and time frames per a given business competency and/or business process, as the same will be appreciated by one of ordinary skill in the art. The participant load module 330-1 includes instructions to match a participant list from the client provided file to existing participants in the system. For example, the participant load module 330-1 can execute instructions to locate an individual by an employee id, social security number, last name and birth date, email, and/or other key identifiers. Embodiments, however, are not limited to these examples. Thus, in various embodiments the participant load module 330-1 can execute instructions to allow a system user to resolve conflicts from matching the participant list to the existing participants and to intelligently provide one or more resolution options based on participant history, e.g., when participant information was loaded in a previous month. Examples of providing one or more resolution options include, but are not limited to, an ignore option, a cancel option, a move option, and a leave option, as the same will be appreciated by one of ordinary skill in the art upon reading this disclosure. The participant load module 330-1 is further able to execute instructions to provide summary and detailed view of registered participant for confirmation.

The enrollment module 330-2 shown in the embodiment of FIG. 3 includes instructions which can execute to identify who within an organization will participate in a given assessment, whether an opinion program, appraisal program, exit interview, resource optimization, multi-rater feedback, etc. By way of example and not by way of limitation, the enrollment module 330-2 executes instructions to provide a process for selecting a number of individuals that will be completing surveys for use in a resource assessment project. As one of ordinary skill in the art will appreciate upon reading this disclosure, the enrollment module 330-2 can execute instructions which provide the ability to import lists of participants, participant personal information, or have the information entered by a user, such as the participant or an administrator themselves, among other techniques.

The data collection module 330-3 shown in the embodiment of FIG. 3 includes instructions which can execute to perform data capture, e.g., to collect the input and responses of various participants to various assessments. By way of example and not by way of limitation, the data collection module 330-3 includes logic which executes instructions to collecting survey data. Examples of survey formatting and data collection are illustrated and discussed in more detail in connection with FIGS. 10 and 11.

The communications and notifications module 330-4 shown in the embodiment of FIG. 3 includes instructions which can execute to facilitate sending and receiving communications and notifications between assessment participants and users, e.g., administrators of particular assessments. Examples of communications and notifications that can be facilitated by the communications and notifications module 330-9 are shown and described in FIGS. 4-9. Further the communications and notifications module 330-9 can execute instructions to perform follow ups with various participants in various assessments and to present the results and/or to provide a follow-up assessment to a particular participant, as the same will be understood from examples given below. An example of a follow up process that can be facilitated is shown and described with respect to FIG. 8.

The reporting module 330-5 shown in the embodiment of FIG. 3 includes instructions which can execute to allow participants to request feedback reports upon receiving a particular number of responses. In the various embodiments, in conjunction with a organization specific, selectable configuration (discussed more in detail with the "user defined" module) input can be provided to the reporting module 330-5 program instructions to determine or establish a particular number of responses required from a participant before the participant can request a given feedback report. In the various embodiments, the reporting module 330-5 includes instructions which can execute to allow defined users (e.g., defined based on input) to request reports for selected participants and groups of participants. Upon such a report request, the reporting module 330-5 can execute instructions to automatically queue up reports for production, as the same will be known and understood by one of ordinary skill in the art. Further, when running queued reports, the reporting module 330-5 can execute instructions to automatically extract relevant data for reports based on configurable report data rules (e.g., as definable in conjunction with the "user defined" module). In the various embodiments, the relevant data can come from multiple assessments from multiple time periods.

Figure 3B:
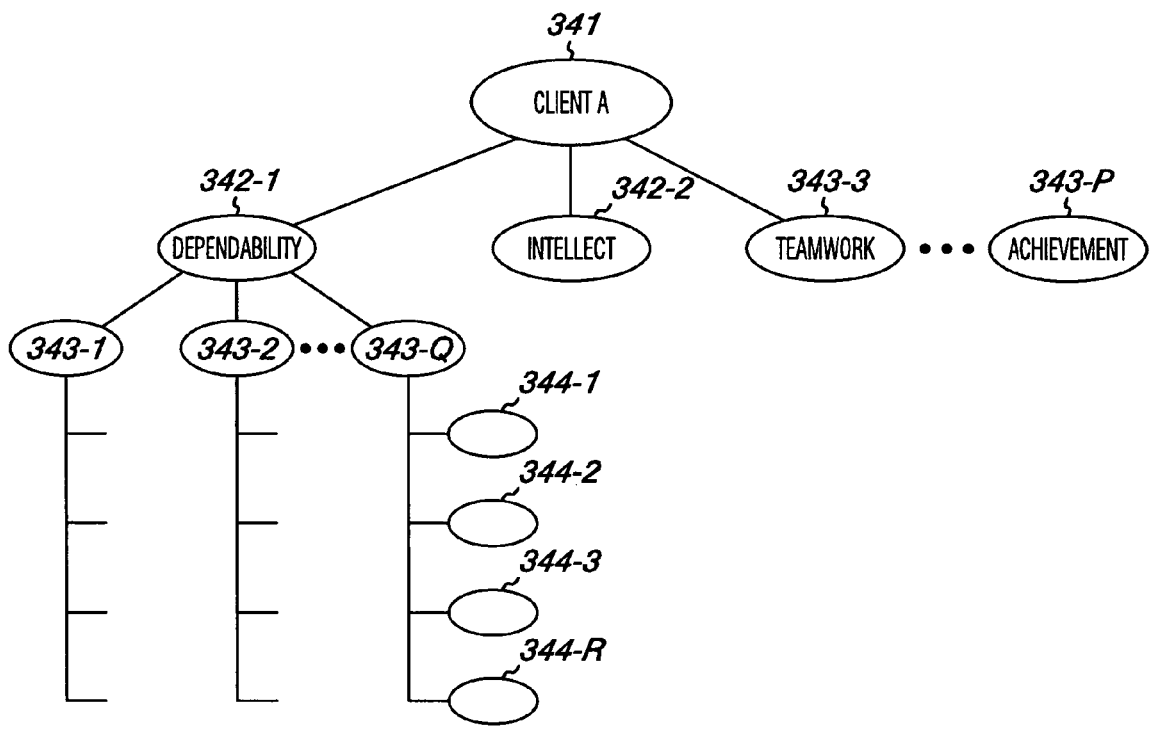
FIG. 3B illustrates an embodiment of an organizational competency structure.
Figure 3C:
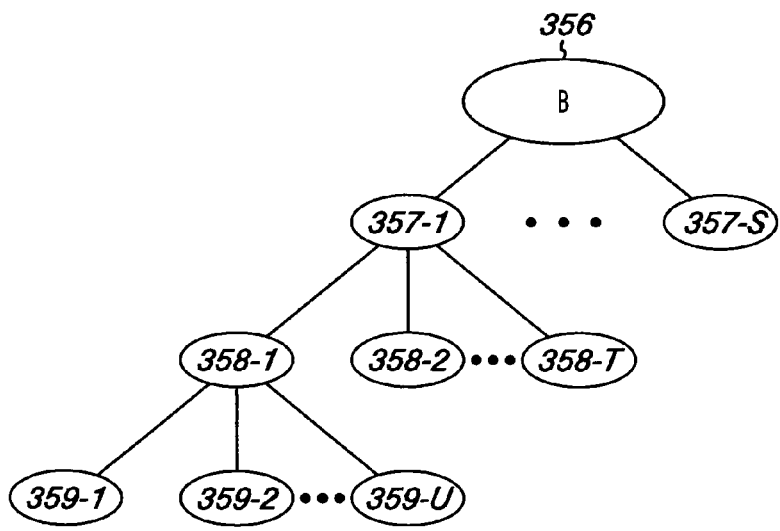
FIG. 3C illustrates another embodiment of an organization competency structure.

The user defined module 330-6 shown in the embodiment of FIG. 3 includes instructions which can execute to load client (e.g., organization) specific content, including business processes content in the form of various business factors, competency criteria (including particular competency structures and terminology as illustrated more in connection with FIGS. 3B and 3C), associated proprietary or relevant third party assessments, and other organization business items of the like (e.g., corporate branding, promotion, and identity pieces). As one of ordinary skill in the art will appreciate upon reading this disclosure, there can be hundreds of selectable business factors, competency criteria, assessments and the like for a given organization to choose from, and from which at any given time an organization may select to implement as part of their business model. As such, according to the various embodiments, the user defined module 330-6 includes instructions which can execute to manage changes (e.g., versioning) to a given organization's business process content over time.

The user defined module 330-6 can execute instructions to leverage organizational content in various manners. For example, the user defined module 330-6 can execute instructions to build assessments for particular populations, e.g. job groups. Further, the user defined module 330-6 can execute instructions to reuse assessment structures across different areas in the organization. For example, an assessment structure including competency criteria in relating to a store manager level position in a given organization may have applicability for which the organization leverages, e.g., implements portions of, this assessment structure in department level positions. That is, an organization can use the user definable module 330-6 to execute instructions to build a self leadership assessment structure which it then uses both at a store manager level and a department level.

As one of ordinary skill in the art will appreciate upon reading this disclosure, the user defined module 330-6 can execute instructions in an organization specific, selectable configuration, to provide a user interface for initiating and defining new assessments. Additionally, the user defined module 330-6 can execute instructions to allow users to customize text associated with particular assessments. For example, the user defined module 330-6 can execute instructions in formatting surveys, including question types, content of questions, etc., to create open ended comment questions such as "What are this individual's three greatest strengths?" or "Have you seen any improvement in this individual's leadership skills?" or "In what ways has this individual evidenced their capabilities for thought leadership?" Embodiments, however, are not limited to these examples.

As one of ordinary skill in the art will appreciate upon reading this disclosure, the user defined module 330-6 can execute instructions in an organization specific, selectable configuration, to provide a user interface for self-authoring content. This can include, but is not limited to, the ability of an organization to expand a competency model, e.g., by adding a new competency criteria to the competency model.

One of ordinary skill in the art will appreciate upon reading this disclosure that the user defined module 330-6 includes and can execute instructions to create various assessments, including appraisal assessments, resource optimization assessments, multi-rater assessment, etc., for various different populations within various different organizations, each having different business processes. The user defined module can also execute instructions to build assessments for certain selected groups or populations within an organization. For example, a user defined module can allow an organization to specify a menu to a participant, such that the participant can select from only a specific list of choices/responses, e.g., from a list of departments, divisions, regions, employment roles, or other demographic distinctions, etc. This allows a user to monitor and compare how various segments of populations respond to certain assessments or assessment content. An organization can upload a file, e.g. a spreadsheet, containing the list of the specific allowable responses. The spreadsheet can be updatable, allowing an organization to alter the list of allowable responses, i.e., organization specific terms for employee positions, departments, divisions, etc.

One of ordinary skill in the art will appreciate upon reading this disclosure that the user defined module 330-6 includes and can execute instructions to allow for the ability to compare existing models and highlight overlap between models. As previously mentioned, an organization may have several competency models, e.g., separate models for executives, managers, supervisors, or other role specific competency models. The user defined module can also execute instructions to allow a user to self-author content and to add new competency criteria to a competency model. The self-authored content, i.e., the new competency criteria can then be implemented using the data collection module 330-3, scoring module 330-9, and reporting module 330-5. A user can add the same new competency criteria to more than one competency model. A user can then compare overlap between various competency models. Comparing competency models within an organization can be used for succession planning, for example. That is, the comparison can be used to determine areas in which an individual could improve in order to be successful as a supervisor, manager, executive, etc.

As one will appreciate from reading further herein, the user defined module 330-6 can execute instructions (based on individual organization input) to create unique formatting. For example, the user defined module 330-6 can receive input and execute instructions to allow a user to identify what formatting features to use when creating a new survey or report and reuse and reapply that formatting to enable the surveys and reports to have a similar style and feel to that of those previously created. As used herein, formatting of surveys can include creating and arranging the questions, answers, rating scales, information to be provided on the page with the questions, such as instructions symbol or color reference keys, etc. As another example, the user defined module can execute instruction based on specific organization input to determine the kinds of information to be provided in executing instruction on the reporting module 330-5, e.g., can define what information is to be used in a particular type of report, can define how the information is to be presented, such as in text, in an chart or graph, and can define what the chart or graph will look like (e.g., bar, pie, line, histogram, etc.).

Thus, features for both the data collection module 330-3 and the reporting module 330-5 can be user defined. As will be explained in more detail below, the user defined module 330-6 executes instructions in conjunction with a configuration module, shown at block 328, such that business processes, content, and formatting can be achieved at an organization by organization basis using a single resource planning device system.

The status and administration module 330-7 shown in the embodiment of FIG. 3 can execute instructions to allow a user of the system to identify the status of an assessment for a particular individual and/or group of individuals. By way of example and not by way of limitation, and will be illustrated in more detail in the Figures which follow, the status and administration module can execute instructions to send notices to assessment participants. Additionally, the status and administration module 330-7 can execute instructions which define the steps necessary to fulfill a survey, a scoring function, and/or a reporting function of the embodiments of the present invention. For example, the status and administration module 330-7 can execute instructions to allow a participant to follow certain user input defined steps to complete an assessment or a reporting function. That is, the status and administration module 330-7 can execute instructions which require that before a report can be generated raters and/or approvers (as discussed below) have to be identified and approved, and/or a defined number of surveys have to be taken. However, embodiments of the invention are not limited to these examples.

The action plan module 330-8 shown in the embodiment of FIG. 3 can execute instructions to associate particular goals of an individual, group, and organization with an organization's business processes, including competency models, to identify training needs. The action plan module 330-8 can execute instructions to recommend particular tasks by integrating a human resource scoring capability in the scoring module (discussed in more detail below) with the organization's competency models. For example, the action plan module 330-8 can execute instructions to initiate another assessment for a particular individual, e.g., another multi-rater assessment. The action plan module 330-8 can execute instructions to allow a user to make recommended tasks actionable by integrating an organization specific, selectable configuration of development content with the organization's competency models. For example, the action plan module 330-8 can execute instructions, based on a participant's scoring and a given organization specific, selectable configuration of development content and competency model, to suggest additional development activities and/or any additional suitable content to various participants.

The action plan module 330-8 can additionally execute instructions to reconcile particular individual goals to particular organizational goals. For example, the action plan module 330-8 can execute instructions to suggest specific individual goals that, if pursued, could effectively aid in achieving corporate goals and thus aid in aligning specific individual goals and specific corporate goals. Particular individual goals can include but are not limited to increasing morale, increasing sales, increasing efficiency, etc. Particular organizational goals can include but are not limited to improving profitability, employee development and retention, increased market share, etc. The action plan module 330-8 can also execute instructions to determine the effectiveness of aligning specific individual goals and specific corporate goals, i.e. if the organizational goal of increasing profits by 20% was increased due to pursuit of the individual goal of increased efficiency, for example.

The action plan module 330-8 can additionally execute instructions to measure participant progress toward human resource performance goals in association with development content. For example, the action plan module 330-8 can execute instructions to compare subsequently received assessment data on a particular participant, e.g., time two (2) data, with assessment data previously received for that individual. Further, the action plan module 330-8 can, in conjunction with the organization specific, selectable configuration, execute instructions to present for review and distribution measured participant progress toward human resource performance goals.

The scoring module 330-9 shown in the embodiment of FIG. 3 includes instructions which can execute to identify a subject of a score. As used herein, the subject of a score can be an individual, a group, a region, etc. That is, the scoring module 330-9 in conjunction with the configuration module 328 can execute instructions to recognize a flag or other marker within the system, as the same will be known and understood by one of ordinary skill in the art, to identify the subject of a score within the system. Scoring can also include weighting of the answers with respect to each other and the weighting of one assessment, or answers from a assessment, versus another assessment, or its answers as part of a validation procedure. Assessment answers can also be combined to have a cumulative weight and such weights can be determined during the formatting process. Scoring can also leverage existing assessments, e.g., interviews, 360 feedbacks, etc., for selection decisions (described below). In various embodiments, the scoring can allow for comparable instruments to be compared. That is, Test A and Test B may be different instruments but are deemed comparable if they measure the same thing, e.g., the same competency criteria and/or subset. For example, as will be explained further in connection with the selection module, the system can compare a candidate's scores from Test A with another candidates scores from Test B. Thus, the system can configure various scoring routines based on various levels and configuration models for individuals, groups, regions, etc., e.g. various types of subjects.

In the various embodiments, the scoring module 330-9 can execute instructions to interpret data collected from multiple assessments. That is, once the scoring module identifies a subject, the scoring module can execute instructions to access and compare all assessment data and information relating to this subject from multiple generations, e.g., all survey data on an individual, multiple generations of performance data and compare differences among multiple generations. In conjunction with the selectably configurable business rules, and according to an organization specific, selectable configuration, e.g., using the configuration module 328 and the user defined module 330-6, the system can execute instructions to aggregate data. For example, the system can group data by a perspective to compute a peer average and can group data into themes, e.g., average selected data points to compute "leadership average", etc.

The scoring module 330-9 can further execute instructions to compute an organization configurable set of statistics, e.g., means, standard deviation, percentiles, etc. And, the scoring module 330-9 can execute instructions to score in real time, e.g., scores are immediately available after an assessment for use in decision making. The scoring module 330-9 can execute instructions to save scores in a data store for quick future retrieval. In this manner, the system can maintain and execute instructions to update saved scores as changes occur in data. In other words, the system knows when scores change and the background on the scores. For example, the system can execute instructions to periodically check a data store for updated information and assessment data related to a particular subject and re-compute scoring accordingly. As described herein the system can further execute instructions to present scores for display purposes.

The selection module 330-10 shown in the embodiment of FIG. 3 includes instructions which can execute to create opening and vacancy listings for an organization. The selection module 330-10 can execute instructions to search and identify candidates to enter as applicants. The selection module 330-10 can execute instructions to administer assessments to candidates in association with opening and vacancy listings. The selection module 330-10 can execute instructions to display candidates and assessment scores in a user selectable ranking order for decision making. In conjunction with the organization specific, selectable configuration, the selection module 330-10 can execute instructions to allow opening and vacancy processing to include multiple steps (e.g., initial screen, interview, etc.) and enforce which candidates can proceed to subsequent steps. For example, one particular organization may have a particular set of steps they wish to use in their business process and another organization may have a different particular set of steps associated their opening and vacancy business process. The system can be selectably configured to accommodate these accordingly. Thus, using configured business rules, the system can enforce which candidates are allowed to proceed to subsequent steps in accordance compliance, legal guidelines, or otherwise. The selection module 330-10 can also execute instructions to capture dispositions (e.g., candidate withdrew, etc.) at each step of processing to record decisions in accordance compliance, legal guidelines, or otherwise. And, the selection module 330-10 can execute instructions to require user input explanations if candidates are entered as applicants outside of system search and identification criteria, e.g., explain why a candidate who did not meet a particular set of prerequisites has been entered and is being considered as a candidate and/or why a candidate who did meet a set of requisites or thresholds is not proceeding to a next step as a candidate.

Thus, in various embodiments, the selection module can execute instructions to perform a process for defining the criteria that can be used to select a candidate based upon information provided to the systems or device embodiments of the present invention. For instance, the rating criteria can be based upon a combination of a number of scores from competency assessments taken by a participant, comparison of one or more assessment scores with the assessment scores of other candidates, and other such performance measures. Additionally, the selection module 330-10 can execute instructions, in conjunction with the organization specific, selectable configuration, to indicate an amount of training that an individual may require in relation to the individual's general individual training readiness.

Corporate identity and branding module 330-S provides a process for adding branding information to the content of the assessment project including to the surveys taken by the individuals. The corporate identity and branding module 330-S allows an organization, such as a corporation, to format surveys and reports to reflect a unique identity or branding used by the organization. For example, a company may use a particular shade of blue in on its letterhead or in its logo. That shade of blue, the logo, and/or other features can be used by the corporate identity and branding module 330-S to give the surveys and reports used by the organization an identifiable link to the identity and branding of the organization. This allows the system or device to be customized for use with one or more particular entities.

The configuration module 328 can be used to apply selectably configurable business rules in conjunction with the instructions provided by the various program modules 330-1 to 330-S to analyze the human resource information, produce reports, and provide action planning. The configuration module 328 shown in the embodiment of FIG. 3 includes selectably configurable logic based on input (e.g., switches which can be turned "on" or "off" as suitable) to establish business rules with a number of different organizations, wherein the business rules are organization process neutral, organization branding neutral, and assessment content neutral. In conjunction with the business rules established by the configuration module 328, instructions can be executed to query the system to show assessment scores for a selected population. For example, instructions can be executed to query the system to show assessment scores at configurable levels. That is, the system can be queried to show raw scores and to summarize scores according to the organization specific, selectable configuration. In conjunction with the business rules established by the configuration module 328, instructions can be executed to manage permissions regulating who in an organization can see what scores.

Further, in conjunction with the business rules established by the configuration module 328, instructions can be executed to provide multiple views of scores including scores for individuals and scores for groups of individuals. And, in conjunction with the business rules established by the configuration module 328, instructions can be executed to permit an authorized user to drill down through levels of scores, as the same will be known and understood by one of ordinary skill in the art upon reading this disclosure. Additionally, information can be obtained by the program modules 330-1 to 330-S regarding the content and organization of questions and answers and the corporate identity and branding. This information, as described above, for example, can be interpreted by the configuration module 328 and used to create a number of surveys and reports.

The embodiment of FIG. 3 further illustrates several business processes, shown within block 329, that can be supported by the system embodiments, including the program modules and configuration module embodiments described above. The exemplary business processes 329 illustrated include, but are not limited to: employee opinion programs 331-1, performance appraisal programs 331-2, interview programs 331-3 (such as exit and/or selection interview programs), resource optimization programs 331-4, and multi-rater feedback programs 331-T, to name a few and as discussed in more detail below. The program modules 328 and 329 can reside within a system or device embodiment of the present invention or can be provided by a third party and/or be located on a third party system or device. As discussed in more detail below, assessment programs can be used to survey employees on performance or other business related issues. The feedback can then be analyzed and a report can be generated. The analysis can be done through the use of computer executable instructions or manually. If analyzed manually the results of the analysis can be entered into the system or device and a report can be generated based upon the information entered. The information can also be combined with other information on the system or device or from a third party in generating the report.

As the reader will appreciate, the program modules 327, configuration module 328, and business processes 329 can be used collectively, for example, to intake information from a participant, an organization that is assessing its employees' performance, and/or information from a third party. For instance, the program module can be used to collect information on the format of surveys to be administered, intake of participant information, content of a survey, selection of raters, selection of approvers, communication with participants, scheduling of events occurring with respect to the surveying process, scoring of data, reporting, and other such functions. The content neutral business rules can be used to identify the information that can be collected from a participant. The rules can then be used to tailor the method and types of information collected based upon the needs of the particular entity that is to be using the device or system to assess its resources.

For example, an entity may have a data base that already includes the sets of raters and/or approvers for each survey. This information can be accessed by a system or device embodiment of the present invention or can be imported into the system or device for use by the system. In such cases, the business rules regarding the selection of raters and/or approvers may not be necessary or can be designed to accommodate the use of the rater/approver data.

FIG. 3B illustrates an embodiment of an organizational competency structure. As shown in the embodiment of FIG. 3B, a given organization 341, e.g., client A, will have its own particular business processes. And, as illustrated in FIG. 3B, these business processes include organization specific competency models with particular competency criteria chosen by the organization. By way of example and not by way of limitation, these competency criteria can include communication skills, leadership skills, decision making skills, initiative skills, and people skills, among others. One of ordinary skill in the art will appreciate that various different organizations will have their own independent competency structure and terminology. According to embodiments of the present invention, the human resource planning device, systems, and methods described herein, are able to interact with, e.g., by selectably configuring logic based on input to establish business rules with a number of different organizations, to implement any number of different organization's business processes and particular competency criteria, branding and identity, and assessment content. In other words, the human resource planning device, systems, and methods are process neutral, brand neutral, and assessment neutral between various organizations.

The embodiment of FIG. 3B illustrates one example of a competency structure broken out with four examples of competency criteria for leadership, e.g., dependability 342-1, intellect 342-2, teamwork 342-3, and achievement 343-P. The designator "P" is used to indicate that any number of competency criteria can be defined for a given organization using the user defined module 330-6 described above in FIG. 3B. Embodiments are not limited to these examples. FIG. 3B further illustrates that each particular competency criteria, 342-1, 342-2, 342-3, . . . , 343-P can be further broken down into additional competency structure and terminology, e.g., 343-1, 343-2, . . . , 343-Q, and 344-1, 344-2, 344-3, and 344-R. As one of ordinary skill in the art will appreciate upon reading this disclosure, an organization can, through a user defined module 330-6, self-author content by adding a new competency criteria, e.g., "adaptability," to a competency structure such as that depicted in FIG. 3B. This new competency criteria, along with its corresponding sub-structure, can become part of the competency model. The self-authored content, i.e., the new competency criteria can then be implemented using the data collection module 330-3, scoring module 330-9, and reporting module 330-5.

FIG. 3C illustrates another embodiment of an organization competency structure. In the embodiment of FIG. 3C for organization (e.g., client B) 356 two particular competency criteria 357-1 and 357-2 are illustrated. The embodiment of FIG. 3C illustrates competency criteria 357-1 and 357-2 further broken down into additional competency structure and terminology 358-1, 358-2, . . . , 358-T, and 359-1, 359-2, . . . , 359-U. One of ordinary skill in the art will appreciate upon reading this disclosure the myriad of choices and selections that can be configured using the user defined module 330-6 in conjunction with the configuration module 328 to selectively implement any number of different organization's business processes and particular competency criteria, branding and identity, and assessment content according to the human resource planning devices, systems, and methods described herein.

FIG. 4 is a block diagram representing an assessment process embodiment. The embodiment of FIG. 4, includes a home intro and log-in 401, a rater initial notification 402, external survey data 403, a perspective choice 404, a survey 405, a thank you page 406, and raw data 408.

As shown in the embodiment of FIG. 4, the diagram includes a block 401 representing a participant entry point for a particular organization. This can include an organization specific introduction and log-in point such as provided through a graphical user interface. According to various embodiments, the participant entry point block 401 includes a participant loading module coupled to a processor and a memory, as the same have been described herein.

As described herein, the content of the assessment used by a particular organization can be specific to the particular organization. That is, a given organization can provide the content it chooses to use as suited to its particular employee opinion survey. The embodiment of FIG. 4 illustrates at block 402 that an email notification can be transmitted to participants and illustrates at block 403 that a given survey, again proprietary or otherwise, can be loaded, e.g., optically scanned, digitally retrieved, or otherwise, into a system, as is described herein, at the participant entry point 401.

As shown in the flow diagram embodiment of FIG. 4, a user can input instructions at block 404 to select a perspective set. That is, the group of participant who will be asked to provide input responses to the survey. As described herein, the perspective set can be an organization specific perspective set defined to group responses based on demographics such as function, role, location, etc., e.g., can include a subordinate level employee; a peer level employee; a supervisor; and an external customer. Embodiments, however, are not limited to these examples. According to various embodiments, program instructions can be executed by the processor, in conjunction with a defined set of business rules, to change a nomenclature associated with a given human resource perspective.

As shown in block 405, participants can provide input responses to the survey through a graphical user interface in a web-enabled environment. As shown at block 406, a participant can submit the survey, e.g. to a data collection module and a scoring module as the same have been described herein. Additionally, as shown, a participant can save a partially completed survey and return to the same using a participant ID, for example, at a later point in time.

The answers to the survey can be saved as raw data 408 that can be used to compile one or more reports or scores. Additionally, external survey data 403 can be used to supplement, or in place of, data collected in a survey process such as the embodiment shown in FIG. 4. In this way, scores and reports can use various types of available data to evaluate performance of an individual.

Figure 5:
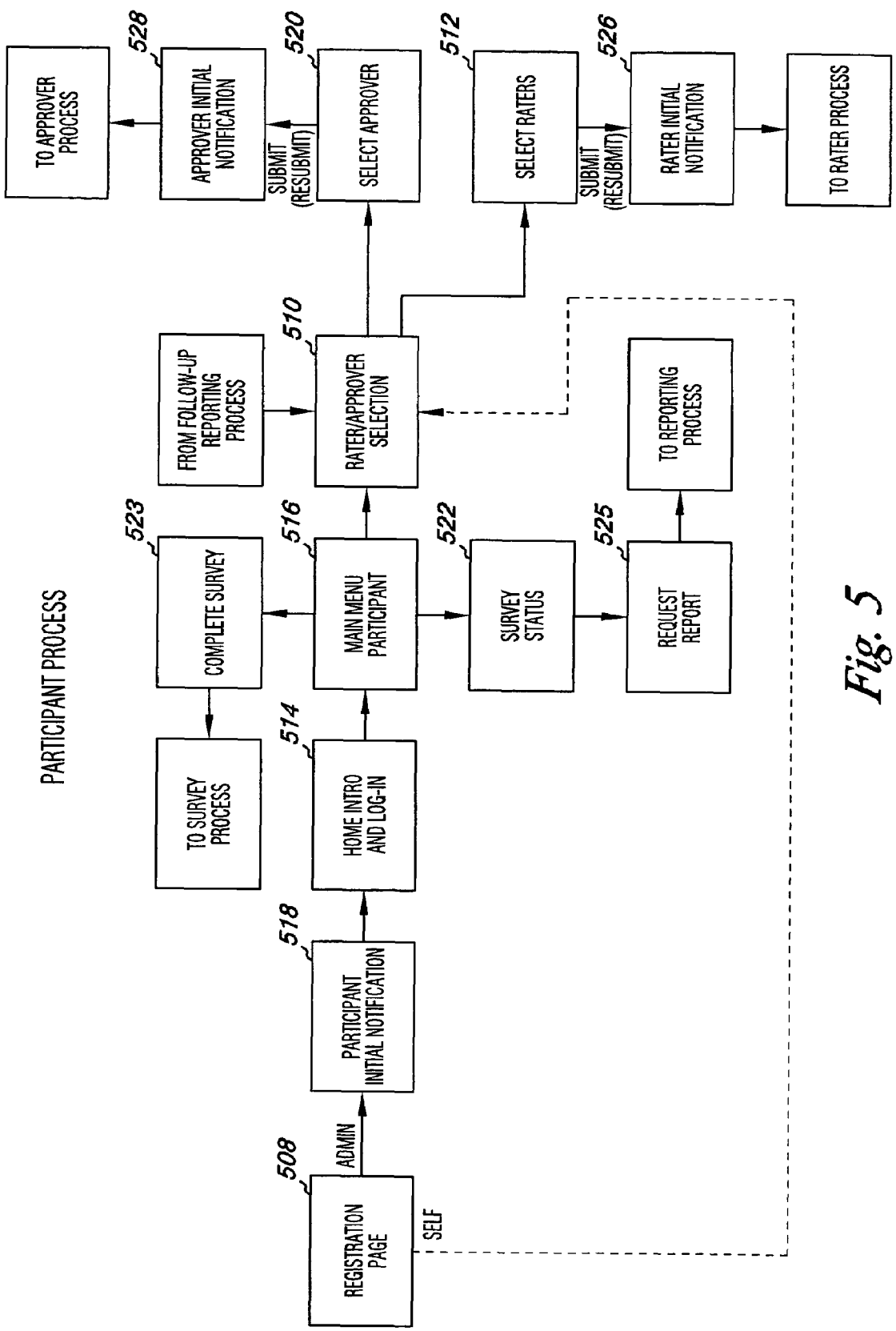
FIG. 5 illustrates a flow chart diagram for an embodiment of a participant process.

FIG. 5 illustrates a flow chart diagram for an embodiment of a participant process. The embodiment of FIG. 5 generally includes a registration page 508, a home intro and log-in 514, a participant main menu 516, a rater/approver selection 510, a survey status 522, a complete survey 523, a rater initial notification 526, and an approver initial notification 528. As shown in the embodiment of FIG. 5, the diagram includes a block 508 at which participants can be registered, e.g. through a web-page in a web-enabled environment.

As shown in block 508, a self registrant would proceed from the registration page at block 508 to a "rater", e.g., the participant providing responsive input, instruction page at block 510. From this page, the user can, select a number of raters and/or approvers for their surveying process. For example, the user can choose to select a number of raters as shown at block 512. In various embodiments, the user can have one or more of the following options, such as to create a rater list from individuals in the organization, remove a given rater from the list, search through available raters, and/or add raters to the list. Embodiments can also include a rater initial notification 526 that can be forwarded to one or more of the selected raters to inform them that they have been selected. The user can also be directed to a rater process, such as that shown in FIG. 7 and discussed in more detail below, to continue with the surveying process.

As shown at block 520, in some embodiments, a user can also select a number of approvers. In various embodiments the features of the approvers selection process 520 can include one or more features similar to those described above with respect to rater selection 512. As one of ordinary skill in the art will appreciate upon reading this disclosure, other capabilities and features can be included with respect to the rater and approver features used in various embodiments. Embodiments can also include an approver initial notification 528 that can be forwarded to one or more of the selected approvers to inform them that they have been selected. The user can also be directed to an approver process, such as that shown in FIG. 6 and discussed in more detail below, to continue with the surveying process.

Likewise, as shown in block 508, an administrative registrant and/or a third party host registrant can execute program instructions to transmit an initial notification to participants at block 518. As shown in the embodiment of FIG. 5 at block 519, additional participant reminders can also be generated. At block 514, an organization specific introduction and log-in point is provided through a graphical user interface. As in FIG. 4, the participant entry point at block 514 can include a loading module coupled to a processor and a memory, as the same have been described herein. That is, the participant loading module includes a set of instructions which can be stored in memory and executed by the processor to import participant data from a particular organization's enterprise database. In the embodiment of FIG. 5, from block 514 the user can move to a main menu participant page, e.g., screen, and from there can advance to the rater/approver selection block 510 as described above.

As shown in the embodiment of FIG. 5, the user could additionally move to a page to check a status of a given survey, as shown at block 522 and can move to a page to complete a given survey, as shown in block 523. The embodiments of the present invention can also provide that the user can request one or more reports at block 525. For example, in the embodiment shown in FIG. 5, the user can check the status of one or more surveys and can generate reports and/or scoring based upon the results of the raw data from completed and/or partially completed surveys.

The embodiment of FIG. 5, additionally illustrates that once a user has completed the rater/approver select at block 510, the selection(s) will be submitted and/or resubmitted to a chosen approver at which time an initial approver notification can be generated, e.g., in the form of an email notification at block 528. In various embodiments, approval of the rater list can be required before initial rater notification 526 is transmitted to one or more of the raters.

Figure 6:
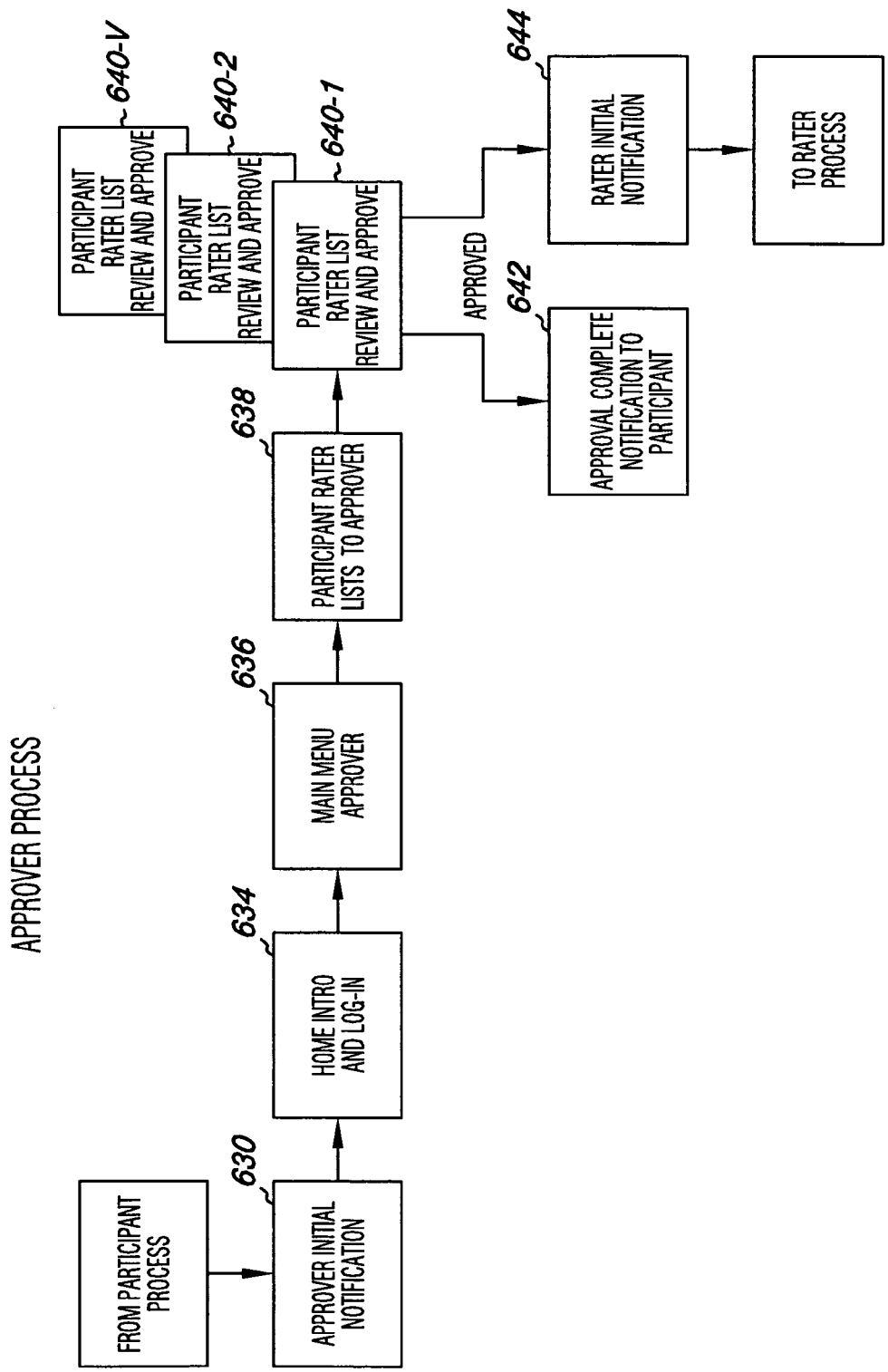
FIG. 6 is a block diagram representing an approver process setup embodiment.

FIG. 6 is a block diagram representing an approver process embodiment. The approver process embodiment shown in FIG. 6 generally includes a home intro and log-in 634, an approver main menu 636, and approver rater confirmation 638.

As shown in the embodiment of FIG. 6, the diagram includes a block 630 continuing from the approver notification, shown as 528 in FIG. 5. At block 634 an organization specific introduction and log-in point, such as has been described above, is provided through a graphical user interface. From this page, a user can move to a main menu approver page shown at block 636. From the main menu approver page 636 the user can move to view relevant participant rater lists to approve at block 638. One of ordinary skill in the art will appreciate upon reading this disclosure the manner in which the program instructions embodiments described herein can be executed to allow a particular organization to designate appropriate approvers. These instructions can execute in conjunction with the defined set of business rules discussed herein to make relevant participant rater lists available to the relevant approver.

As shown in block 640-1, 640-2, . . . , 640-V, a particular approver can sort through, e.g., review and approve, various participant rater lists which have been submitted to their queue. Upon review and approval of a particular participant rater list, a participant can be notified that the approval process is complete as shown in block 642. Likewise, selected raters associated with a particular survey will be notified as shown in block 644. When the participant is notified at block 642 the participant process will continue as illustrated in FIG. 5. When the selected raters associated with a particular survey are notified at block 644 a rater process is continued as discussed next in connection with FIG. 7.

Figure 7:
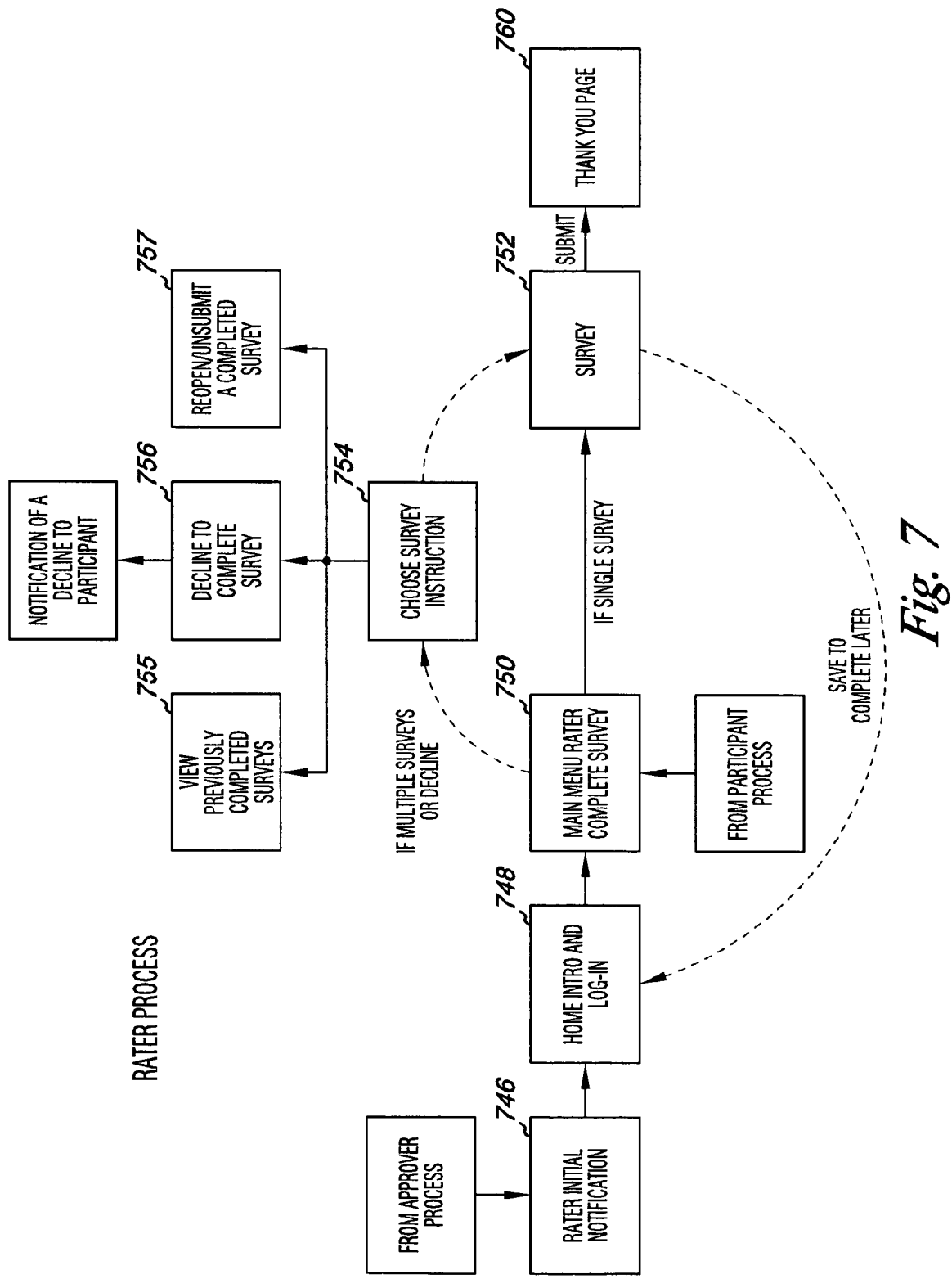
FIG. 7 is a block diagram representing a rater survey process embodiment.

FIG. 7 is a block diagram representing a rater survey process embodiment. The rater process embodiment of FIG. 7 generally includes a home intro and log-in 748, a rater menu 750, and a survey 752.

As shown in the embodiment of FIG. 7, the diagram includes a block 746 continuing from the rater notification, shown as 644 in FIG. 6. At block 748 an organization specific introduction and log-in point, such as has been described above, are provided through a graphical user interface. From this page, a user can move to a main menu rater complete survey page shown at block 750. From the main menu rater page 750 the user can move to view and choose relevant survey instructions at block 754, e.g. in the scenario when multiple surveys are present. One of ordinary skill in the art will appreciate upon reading this disclosure the manner in which the program instructions embodiments described herein can be executed to allow a particular organization to designate appropriate raters. These instructions can execute in conjunction with the defined set of business rules discussed herein to make relevant survey instructions available to the relevant rater.

As shown in the embodiment of FIG. 7, a rater can have several options with respect to completing a survey. For example, a rater can elect to decline a particular survey in which case a decline notification will be generated and transmitted to a relevant participant as shown in block 756. In various embodiments a rater can view previously completed surveys as shown at block 755 and/or reopen/unsubmit a completed survey as shown a block 757. In this way, a rater can have the ability to change a survey after the survey has been submitted. Alternatively, the rater can move from a relevant survey instruction page to the particular survey as shown in block 752. From review of the embodiment of FIG. 7, one will appreciate that when only a single survey is present and the rater has not elected to decline, then the rater could move to the particular survey represented in block 752 from the main menu page in block 750.

The embodiment of FIG. 7, additionally illustrates that once a rater has completed a particular survey at block 752 it can be submitted and the rater can receive confirmation of the submission, such as in the form of a "thank-you" page at block 760. Alternatively, a partially completed survey at block 752 can be saved and the rater can return to the same at a later point in time, e.g., via the organization specific introduction and log-in point at block 748.

Figure 8:
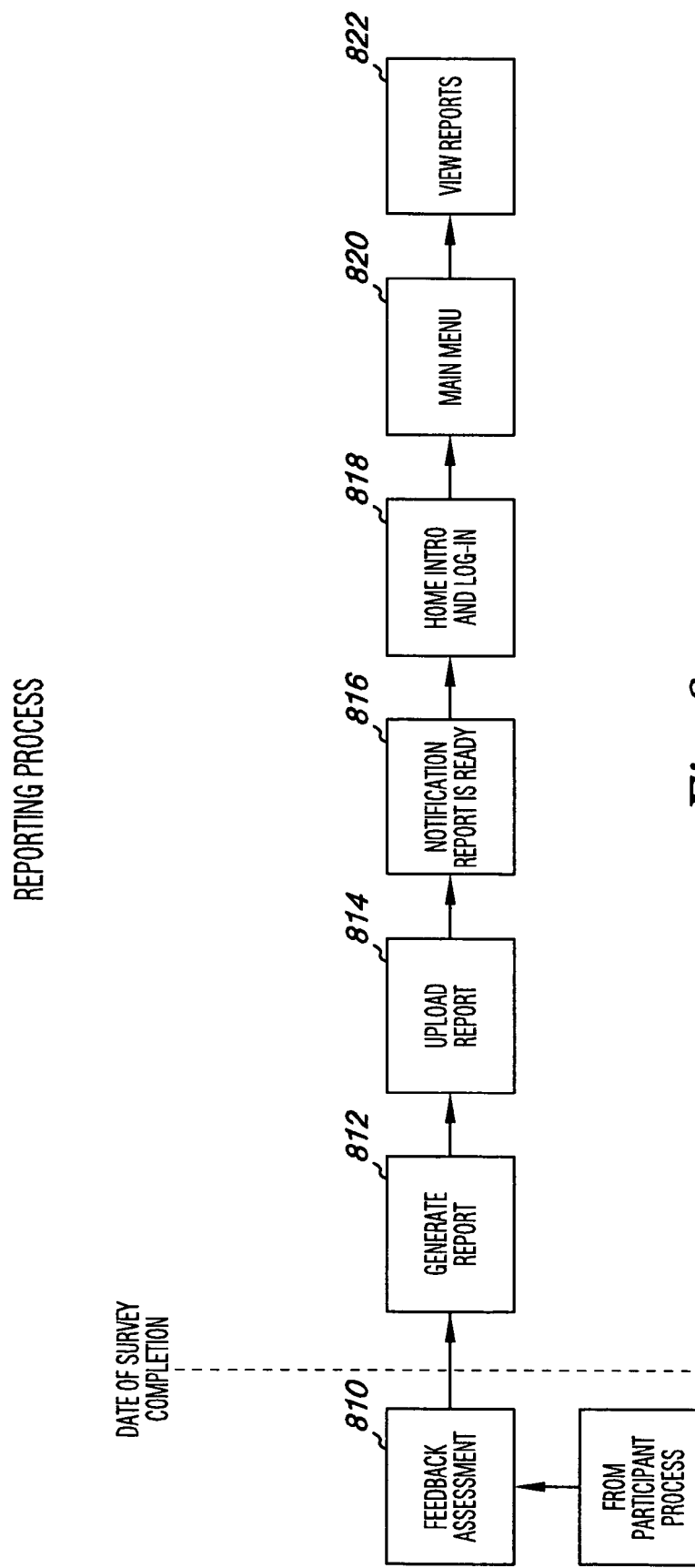
FIG. 8 is a block diagram representing a reporting process embodiment.

FIG. 8 is a block diagram representing a reporting process embodiment. The reporting process embodiment of FIG. 8 includes feedback assessment 810, report generation 812, uploading of report 814, notification of report 816, home intro and log-in 818, main menu 820 and report viewing 822.

As shown in the embodiment of FIG. 8, the diagram illustrates a feedback assessment block 810. According to various embodiments, the feedback assessment block 810 can represent a data collection and scoring module, as the same has been described herein. As illustrated in the embodiment of FIG. 8, before a particular due date a data collection and scoring module can execute program instructions according to the defined set of business rules, e.g., defined by selectably configuring logic based on input to establish business rules with a number of different organizations as the same have been described herein, to provide data to a reporting process. As one of ordinary skill in the art will appreciate upon reading this disclosure, the reporting process illustrated in the embodiment of FIG. 8 can likewise occur through the execution of program instructions in a reporting module, as the same has been described herein, according to the defined set of business rules. According to various embodiments, a reporting module and a scoring module can interact through program embodiment instructions to automatically transfer scoring data from the scoring module to the reporting module without separate data re-entry.

Once data is received by a reporting module the reporting module can execute instructions to generate a report as shown at block 812. Additionally, the program module can execute program instructions to upload a report as selectably configured to a particular organization by user input and in conjunction with the defined set of business rules as shown in block 814. The reporting module can execute instructions to generate a notification to a particular, relevant party at an organization selectable level once the report is ready as shown in block 816. At block 818 an organization specific introduction and log-in point, such as has been described above, are provided through a graphical user interface. From this page, a user can move to a main menu represented at block 820. From the main menu page 820 the user can move to view and choose relevant reports as shown at block 822. One of ordinary skill in the art will appreciate upon reading this disclosure the manner in which the program instructions embodiments described herein can be executed to allow a particular organization to designate selectable reports to generate and upload as well as to designate selectable individuals to receive and to view such reports. These instructions can execute in conjunction with the defined set of business rules discussed herein to make relevant human resource and human capital data available to relevant individuals and/or groups.

Figure 9:
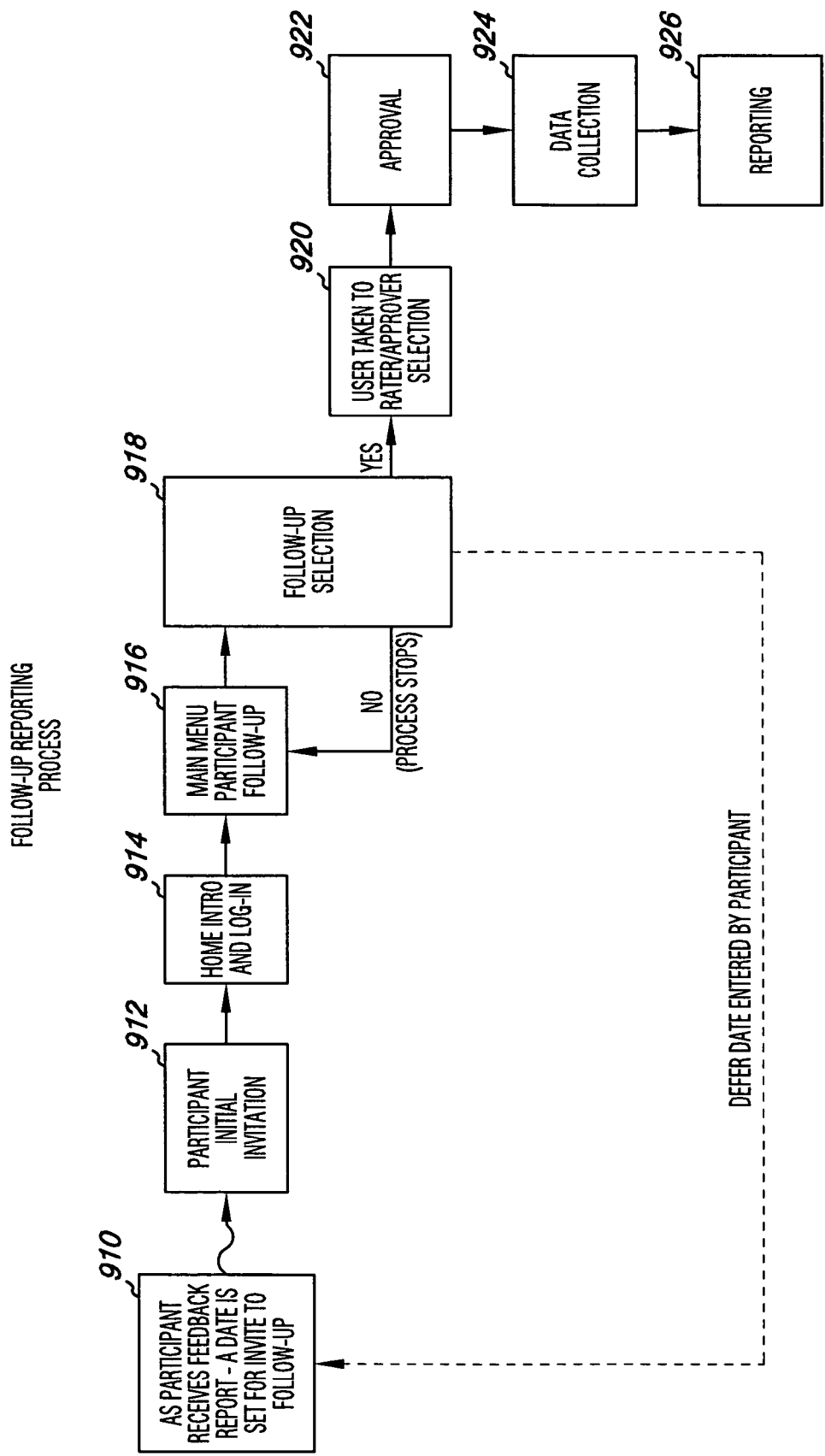
FIG. 9 is a block diagram representing a follow up process embodiment.

FIG. 9 is a block diagram representing a follow up process embodiment. The follow up process embodiment shown in FIG. 9 generally includes home intro and log-in 914, participant main menu 916, follow up selection 918, rater/approver selection 920, approval 922, data collection 924, and reporting 926.

As shown in the embodiment of FIG. 9, the diagram includes a block 910 representing a participant having received a feedback report. According to various embodiments, program instructions can be executed to set a date to follow up. In block 912 a participant receives an initial invitation to respond with follow up.

At block 914 an organization specific introduction and log-in point, such as has been described above, are provided through a graphical user interface. From this page, a user can move to a first instruction main menu for a participant represented at block 916. As shown in the embodiment of FIG. 9, from the first instruction main menu in block 916 a user can select whether or not to proceed with the follow up process making a follow up selection, represented by block 918. In the embodiment shown in FIG. 9, the participant can select "yes" to continue with the follow-up process, "no" to stop the process, or "defer" to postpone the follow up until a later date.

If the participant continues with the follow up process, the participant can be directed to select a number of follow up raters and/or approvers, as indicated in block 920. The participant can choose the raters and/or approvers in any suitable manner. For example, the participant can select a new set of raters and/or approvers or can use a set of raters and/or approvers selected previously. An example of a suitable rater/approver selection process is shown and described in FIG. 5. Likewise, examples of the processes of approval 922, data collection 924, and reporting 926 are shown and described in relation to FIGS. 6-8 respectively.

One of ordinary skill in the art will appreciate upon reading this disclosure the manner in which the program instructions embodiments described herein can be executed to allow a particular organization to designate a selectable follow up process. These instructions can execute in conjunction with the defined set of business rules, e.g., defined by selectably configuring logic based on input to establish business rules with a number of different organizations as the same have been described herein, to provide the follow up process described in FIG. 9 or another particular follow up process as suited to a particular organization. Embodiments of the invention are not limited to the examples given herein.

FIG. 10 is an example of a assessment for measuring an individual's competency in a particular area. The competency assessment illustrated in FIG. 10 includes the competency being measured 1002, a scale rating 1006 for each response scale 1004, and a number of questions to be answered in each of the dual response scales 1004 provided. In the example illustrated in FIG. 10, the competency 1002 being measured is analytical thinking. In measuring an individual's performance in this competency, a number of questions are presented. The questions can be created by the provider of the assessment, the organization or individual doing the assessment, or from a third party test developer. Additionally, the responses and the weighting of the responses can similarly be provided and applied according the defined business rules, e.g., defined by selectably configuring logic based on input to establish business rules with a number of different organizations as the same have been described herein. In the case illustrated in FIG. 10, the assessment is measuring the importance and difficulty of the various issues raised in questions 1010. These responses are provided by a participant selecting a rating from the scale rating choices 1006 and providing the rating in the response scales 1004. The assessments can be defined to have one or more response scales (e.g., FIG. 10 shows a dual response scale assessment) and can have a variety of subject matter and formats depending upon the needs of the organization that is requesting the assessment.

For instance, FIG. 11 is another example of a assessment for measuring an individual's competency in a particular area. The competency assessment illustrated in FIG. 11 includes the competency being measured 1102, a scale rating 1106 for each response scale 1104, and a number of questions to be answered in each of the dual response scales 1104 provided. This assessment is focused on division, business unit, or organization performance with regard to conformance, momentum, and importance. In this example, the format, subject matter, and questioning is different than that shown in the example illustrated in FIG. 10. This example also illustrates that a system embodiment of the present invention can include assessment formats available in several languages.

As one of ordinary skill in the art will appreciate, and as discussed previously in connection with the data collection module 330-3 and the user defined module 330-6, a user can self-author the content of assessments. In connection with FIGS. 10 and 11, a user can also use this capability to monitor trending, e.g., has a particular participant consistently responded to specific assessment content, e.g., by giving a rating of 5, for example. Trending analysis can be used for providing participant accountability, e.g., by prompting a participant to respond to additional assessment content. For example, a participant may be prompted to answer a question such as, "Are you sure?," if that participant's responses tend to conform to a trend.

Figure 12:
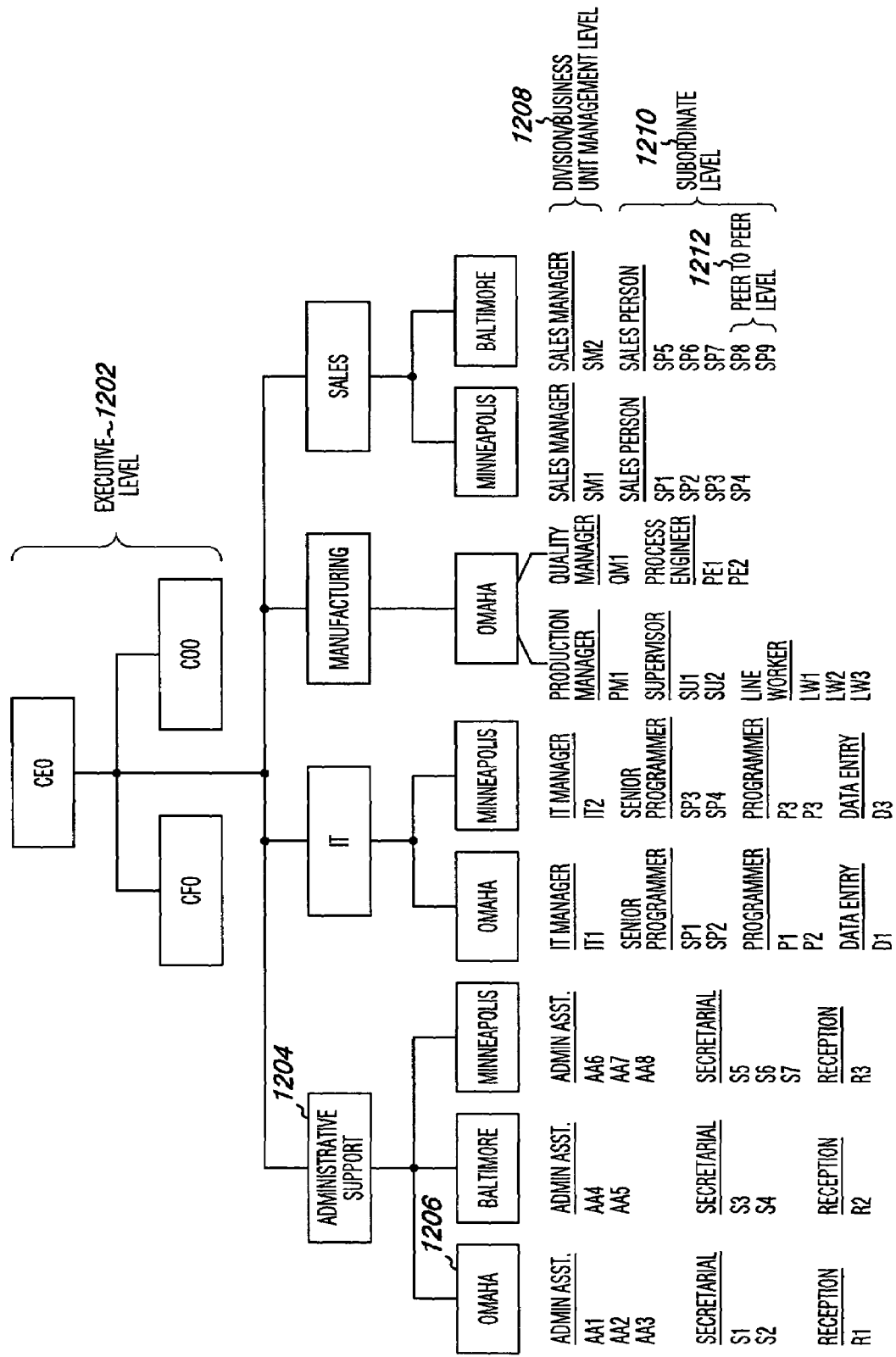
FIG. 12 is a block diagram representing an exemplary corporate organizational chart.

FIG. 12 is a block diagram representing an exemplary corporate organizational chart. The organizational chart in FIG. 12 includes a number of executive level employees 1202, a number of divisions and/or business units within the organization 1204, a number of geographical locations for each division/business unit 1206, a number of division/business management units 1208, a number of subordinate level employees 1210, and a number of peers within each level that have a peer to peer relationship 1212 with the other employees within that level of a business unit or peers across the organization. In the example shown in FIG. 12, each of the employees that have the same job title are given a unique designation (e.g., AA1 for Admin. Assistant #1). In this way, the employees' identity information can be withheld and the employees can be evaluated within the system by their unique designation. Such embodiments can be useful, for example, so that the reviewer is not prejudiced based upon their personal experiences with, and likes and/or dislikes, of certain people. However, the embodiments of the invention are not limited to use of a unique designation, but rather, any identifier can be used to represent an employee including the employee's name. The example chart shown in FIG. 12 is provided to give the reader an understanding of how employees can be organized and grouped based upon an organization's structure.

FIG. 13 is an example of scoring results provided by an embodiment of the present invention. In this embodiment, a system can use employee information and assessment results to provide a snapshot of the level of performance of a set of employees based on the defined business rules, e.g., defined by selectably configuring logic based on input to establish business rules with a number of different organizations as the same have been described herein. The example shown in FIG.

13, illustrates how embodiments of the present invention can provide the status of how well employees from a variety of positions (e.g., IT, production, quality, senior and, sales managers, sales person, supervisor, and process engineer) are prepared for a target position (e.g., production manager) open within the organization. In this example, a combination of information about an employee is used to determine whether the employee is highly recommended, recommended, has insufficient data to be evaluated, has not graduated training, or needs development. Based upon this snapshot, the reviewer of this chart can use this information to see how well their employees are being trained for advancement, whether employees are performing their performance evaluations, and how many employees may be in need of training in order for them to advance, for example. Those skilled in the art will appreciate from reading the present disclosure that there are a number of other items that such a chart can provide and that the above uses are examples of such possible uses.

FIGS. 14A and 14B is another example of scoring results provided by an embodiment of the present invention. In this example, the results are provided in conjunction with a search for candidates to fill a production management position. The example shown in FIGS. 14A and 14B, identifies a number of qualified candidates in order to determine which of these candidates should be scheduled for an interview according to defined business rules, e.g., defined by selectably configuring logic based on input to establish business rules with a number of different organizations as the same have been described herein. The employees in this example are organized from most qualified to least qualified based upon an analysis of the rankings and scores provided on the chart. The organization of the chart can be determined by the intended recipient of the chart and, therefore, can be focused to identify the candidates they deem the best qualified based upon criteria selected by the intended recipient.

In the case shown in FIGS. 14A and 14B, the candidates have been organized based upon an Job Readiness score that is calculated based upon the other scores and rankings shown in the chart. Those of ordinary skill in the art will appreciate from reading the present disclosure that the method of calculating and weighting the various scores and rankings and the methodology used to select a qualified candidate can be accomplished in various manners and that the embodiments of the present invention are not limited in the manner in which the calculations, weighting, and/or selection is accomplished.

FIG. 15 is another example of scoring results provided by an embodiment of the present invention. In the example shown in FIG. 15, a number of production managers are organized based upon their performance in a number of competency areas according to the defined business rules, e.g., defined by selectably configuring logic based on input to establish business rules with a number of different organizations as the same have been described herein. In this example, the employees are organized from those scoring worst at the top and best at the bottom. Above the top of the chart, a key symbol key identifies a number of symbols that can be used to quickly identify the level of performance of an employee in a particular competency area. For example, areas in which the employee needs development are designated by a number 3 with a circle around the number. Those areas that are acceptable are designated by a 2 with a circle around the number and those where the employee is performing well are designated by a 1 with a circle around the number. This allows the reviewer of the chart to quickly identify the level of performance of the employee in the various competency areas. For example, employee 1 needs development in the areas of: overall performance, operations, sales, and zone.

It can also be determined quickly from these designations that employee 1 is performing acceptably in the areas of leadership and mastery. Those competencies not designated with a circled number are areas in which the employee is performing adequately, but not at a level that would be worthy of recommendation for a promotion. Such a chart can be useful, for example, in determining who needs additional training or skill development.

The chart provided in FIG. 15 also can be used to identify if there are particular areas or competencies that need to be improved for all employees within the group included in the chart. This information can be helpful, for example, in identifying subjects that need to be included in training programs. Those skilled in the art will appreciate from reading the present disclosure that various methods of designating the different levels of performance can be achieved in many ways and that the embodiments of the present invention are not limited to the method of designation shown in FIG. 15. For example, color coding of the different levels of performance can provide a similar many of identifying an employees performance in the various areas of competency.

FIG. 16 is an example of a portion of a report provided by an embodiment of the present invention. The information presented on FIG. 16 provides a snapshot of employee opinion with regard to a number of job subjects according to defined business rules, e.g., defined by selectably configuring logic based on input to establish business rules with a number of different organizations as the same have been described herein. The subjects include, but are not limited to: supervision 1610-1, my job 1610-2, training and development 1610-3, teamwork 1610-4, and communications 1610-X. FIG. 16 shows how these subjects are viewed by employees in various different divisions, business units, or employee positions at 1620, such as: technical staff, contact centers and local customer service staff, collections/finance/marketing/risk administrative assistants, and total business unit, to name a few.

FIG. 17 is another example of a portion of a report provided by an embodiment of the present invention according to defined business rules, e.g., defined by selectably configuring logic based on input to establish business rules with a number of different organizations as the same have been described herein. In this Figure, the report illustrates the level of an individual's competency as viewed from a number of different perspectives 1712. For example, as shown in FIG. 17, the individual's strategic development competency 1710 has been rated based upon the answers to the questions 1720-1 to 1720-Y. In this assessment, the questions could be answered based upon a rating scale of 1 to 5, with 1 being "not developed" and 5 being "outstanding". Upon this basis, for example, with respect to 1720-1, the aggregate answers for the question are provided in both a numeric and a graphical representation 1714. For instance, the individual being assessed gave himself a 5.00 for the behavior of gathering strategic information. The individual can review the other ratings provided to gain some perspective of how his performance is viewed by others. For example, all raters submitting ratings gave the individual's performance of this behavior a 4.13 score, his boss and secondary boss each rated his performance of this behavior as a 4.00, while the individual's peers and direct reports rated his performance as a 4.25. Based upon review of one or more of these additional ratings, the individual can identify that although he believes his performance of this behavior is outstanding, his peers and bosses believe that the individual's performance is very strong, but that there is some room for improvement.

Additionally, FIG. 17 also illustrates that embodiments can be provided that allow for different competencies and behaviors to be identified as more important than others with respect to a particular job or based upon the preferences of the individual's boss. In this way, the individual can identify which areas within this competency are viewed as most important for his improvement. This indication can be provided in numerous manners, such as for example, having a shaded area represent those areas that are more important as shown at 1722.

FIG. 17 also illustrates that in various embodiments, one or more competencies or behaviors can be identified as a strength or an area needing development such as by the icons at 1724. In this way, the individual can quickly ascertain which areas need to be improved without studying all of the results on this report. This indication can also be provided in various manners.

FIG. 18 is another example of a portion of a report provided by an embodiment of the present invention according to defined business rules, e.g., defined by selectably configuring logic based on input to establish business rules with a number of different organizations as the same have been described herein. In this portion of a report, a number of competencies 1810 (e.g., strategic focus, financial results, self initiative and drive, problem solving, and talent management) can be assessed in a manner similar to that shown in FIG. 17, but represented in a different format. In this format, the mean score for each reporting perspective set (e.g., self, primary manager, colleagues, direct reports, and customers) is presented graphically and in numeric form. The difference from the individual's own ratings (e.g., difference from self) are also provided to give the individual a quick analysis of the differences between his ratings and those of the other perspective sets. The important viewpoints for each competency are indicated by a number of star icons at 1820.

Figure 19:
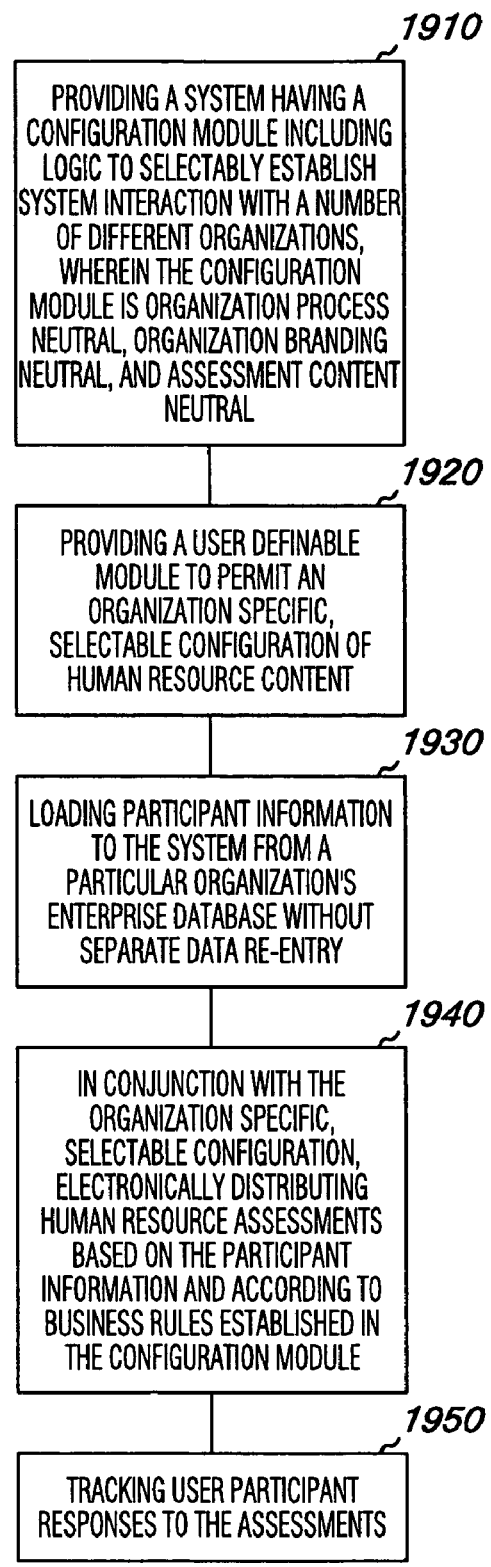
FIG. 19 is an illustration of a method embodiment.
Figure 20:
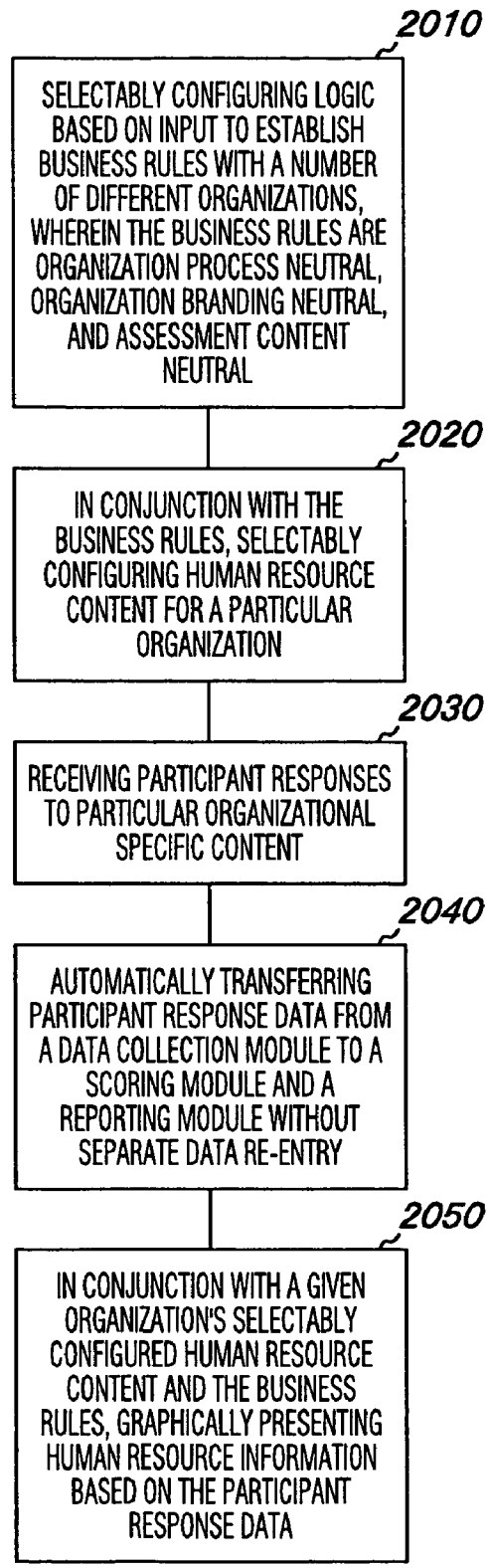
FIG. 20 is an illustration of another method embodiment.

FIGS. 19 and 20 illustrate various method embodiments for resource assessment. As one of ordinary skill in the art will understand, the embodiments can be performed by software/firmware (e.g., computer executable instructions) operable on the devices shown herein or otherwise. The embodiments of the invention, however, are not limited to any particular operating environment or to software written in a particular programming language. Software, application modules, and/or computer executable instructions, suitable for carrying out embodiments of the present invention, can be resident in one or more devices or locations or in several locations.

Unless explicitly stated, the method embodiments described herein are not constrained to a particular order or sequence. Additionally, some of the described method embodiments or elements thereof can occur or be performed at the same point in time.

FIG. 19 illustrates one method embodiment for resource assessment. As shown in the embodiment of FIG. 19, the method includes providing a system having a configuration module including logic to selectably establish system interaction with a number of different organizations at block 1910. As shown in block 1910, the configuration module is organization process neutral, organization branding neutral, and assessment content neutral as the same has been described herein. At block 1920 the method includes providing a user definable module to permit an organization specific, selectable configuration of human resource content. This includes providing a user definable module as the same has been described in detail in connection with the Figures above. At block 1930 the method includes loading participant information to the system from a particular organization's enterprise database without separate data re-entry. This includes using a participant load module as the same has been described in detail in connection with the Figures above.

As shown in block 1940 the method embodiment includes electronically distributing human resource assessments based on the participant information and according to business rules established in a configuration module, in conjunction with the organization specific, selectable configuration, as the same have been described herein. The method embodiment of FIG. 19 further includes tracking user participant responses to the assessments, as shown at block 1950.

FIG. 20 illustrates another method embodiment for resource assessment. As shown in the embodiment of FIG. 20, the method includes selectably configuring logic based on input to establish business rules with a number of different organizations as shown at block 2010. As has been described in detail above, the selectably configurable logic can be configured in a platform independent manner by using input instructions to selective "turn on" and/or "off" particular logic functions as appropriate on an organization by organization basis. And, according to the various embodiment, the selectably configurable logic allows the established (e.g., thence defined business rules) to be organization process neutral, organization branding neutral, and assessment content neutral, as the same has been described in detail above.

As shown in block 2020, the method further includes selectably configuring human resource content for a particular organization, in conjunction with the business rules. At block 2030, the method includes receiving participant responses to particular organizational specific content.

In the embodiment of FIG. 20, and as represented in block 2040, the method includes automatically transferring participant response data from a data collection module to a scoring module and a reporting module without separate data re-entry. At block 2050, the method further includes graphically presenting human resource information based on the participant response data, in conjunction with a given organization's selectably configured human resource content and the business rules. Graphically presenting human resource information based on the participant response data includes the methods and techniques described and illustrated in connection with the Figures above. Embodiments, however, are not limited to these examples.

Although specific embodiments have been illustrated and described herein, those of ordinary skill in the art will appreciate that an arrangement calculated to achieve the same techniques can be substituted for the specific embodiments shown. This disclosure is intended to cover adaptations or variations of various embodiments of the invention.

It is to be understood that the above description has been made in an illustrative fashion, and not a restrictive one. Combination of the above embodiments, and other embodiments not specifically described herein will be apparent to those of skill in the art upon reviewing the above description. The scope of the various embodiments of the invention includes other applications in which the above structures and methods are used. Therefore, the scope of various embodiments of the invention should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the embodiments of the invention require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A human resource assessment device, comprising:
a single human resource planning device configured to enable the creation of an organization specific competency model and an organization specific perspective set associated with human resource assessment for at least one of a plurality of dissimilar organizations, wherein the human resource planning device comprises:
a processor, a memory coupled to the processor, and a user interface coupled to the memory and the processor;
a configuration module, executed by the processor, including program instructions that, when executed, enable a user to selectably establish a human resource assessment system for the plurality of dissimilar organizations;
the configuration module being configured to enable the user to selectably configure several modules, including at least data collection, action planning and reporting, enrollment, and scoring modules, by establishing a set of human resource assessment business rules for at least one organization of the plurality of dissimilar organizations in a manner that is business process neutral, brand neutral, and assessment neutral between the plurality of dissimilar organizations;
wherein the human resource assessment business rules include establishing formatting, branding usage, assessment content, and assessment content handling rules; and
wherein the action plan module includes program instructions executable by the processor to:
receive input for particular individual employee goals, including increasing sales, increasing efficiency, and increasing morale;
receive input for particular organizational goals, including increasing profitability, improving employee development and retention, and expanding market share; and
evaluate the received input to reconcile particular individual employee goals to particular organizational goals, wherein the action plan module executes instructions to present a number of particular additional individual employee tasks that are actionable by an individual employee and reviewed and adjusted at particular intervals, based on results in efficacy and impact of the individual employee tasks, to improve alignment of the particular individual employee goals in order to achieve the particular organizational goals;
a user defined module, executed by the processor and in conjunction with the configuration module, including program instructions that, when executed, load organization specific content, including at least one of a group including business processes content in the form of various business factors, competency criteria, associated proprietary or relevant third party assessments, and corporate branding, promotion, and identity pieces;
a participant loading module, executed by the processor, including a set of program instructions to load at least one client provided file of personnel information from each enterprise database of the plurality of dissimilar organizations; and
a data store that includes a number of separate partitions, at least one for each of the plurality of dissimilar organizations, configured to store data and modules having program instructions for each selectably configured set of human resource assessment business rules;
the single human resource planning device being configured to implement a number of the plurality of the dissimilar organizations' various selectably configured human resource assessment business rules and particular competency criteria, branding and identity, and assessment content based on the program instructions of the selected configured modules, organization specific content, and human resource assessment rules, wherein to implement includes;
to apply the selectably configured human resource assessment business rules according to the program instructions provided by the selected modules in order to analyze human resource information, produce reports, and provide action planning;
to electronically distribute human resource assessments based on the loaded participant information and according to the defined set of human resource assessment business rules established in the configuration module and to track participant responses to the assessments; and
to present organization specific human resource content in a manner that is business process neutral, brand neutral, and assessment neutral between the plurality of dissimilar organizations in order to assist management of each of the plurality of dissimilar organizations in making personnel decisions, wherein the personnel decisions include hiring, firing, and promotion decisions.

2. The device of claim 1, wherein the program instructions to reconcile particular individual employee goals to particular organizational goals include instructions which execute to:
associate particular goals of an individual, group, and organization with the organization specific competency model in order to identify performance goals;
recommend particular tasks by integrating a human resource scoring capability in the scoring module with the organization specific competency model; and
make recommended tasks actionable by integrating an organization specific, selectable configuration of development content with the organization specific competency model.

3. The device of claim 2, wherein the action plan module includes program instructions executable by the processor to:
measure participant progress toward performance goals in association with the organization specific, selectable configuration of development content; and
present for review and distribution measured participant progress toward performance goals, in conjunction with the organization specific, selectable configuration of development content.

4. The device of claim 2, wherein the user definable module includes program instructions executable by the processor to create the organization specific competency model and the organization specific perspective set.

5. The device of claim 4, wherein the organization specific competency model is configured to match different organizations' competency structures and terminology and includes competency criteria including:
communication skills;
leadership skills;
decision making skills;
initiative skills; and
people skills.

6. The device of claim 5, wherein the program instructions are executed by the processor to create a number of subsets to each of the competency criteria including subsets to the leadership skills including:
- achievement;
- dependability;
- teamwork; and
- intellect.

7. The device of claim 4, wherein the organization specific perspective set includes a human resource perspective including:
- a subordinate level employee;
- a peer level employee;
- a supervisor; and
- an external customer.

8. The device of claim 1, wherein the participant load module includes instructions which are executed by the processor to:
- load a client provided file of personnel information into the device;
- map client provided data into the device;
- update participant information from the client provided file;
- match a participant list from the client provided file to existing participants in the device including:
  - allowing a system user to resolve any conflicts from matching the participant list to the existing participants;
  - providing one or more resolution options based on participant history; and
  - providing a summary view of registered participants for confirmation.

* * * * *